US012608182B2

(12) United States Patent
Vembu et al.

(10) Patent No.: US 12,608,182 B2
(45) Date of Patent: Apr. 21, 2026

(54) CONSTRUCT-ASSOCIATED CANDIDATE TAG FOR DEVELOPMENT-PHASE COMPILER REQUESTS

(71) Applicant: Zoho Corporation Private Limited, Kanchipuram District (IN)

(72) Inventors: Sridhar Vembu, Tenkasi (IN); Akshhayaa S, Guduvanchery (IN); Joseph Sathya Kumar, Chennai (IN); Balamurugan K E, Chennai (IN); Suresh Kumar R, Chennai (IN); Mohamed Ismail Kaja Mydeen, Sivakasi (IN); Ramesh Kumar Govindaraj, Rajapalayam (IN)

( * ) Notice: Subject to any disclaimer, the term of this patent is extended or adjusted under 35 U.S.C. 154(b) by 262 days.

(21) Appl. No.: 18/424,632

(22) Filed: Jan. 26, 2024

(65) Prior Publication Data

US 2024/0281225 A1      Aug. 22, 2024

Related U.S. Application Data

(63) Continuation of application No. 18/423,784, filed on Jan. 26, 2024.

(Continued)

(30) Foreign Application Priority Data

Feb. 17, 2023    (IN) .............................. 202341011006

(51) Int. Cl.
| | |
|---|---|
| *G06F 8/41* | (2018.01) |
| *G06F 8/30* | (2018.01) |
| *G06F 21/14* | (2013.01) |

(52) U.S. Cl.
CPC ............... *G06F 8/427* (2013.01); *G06F 8/37* (2013.01); *G06F 8/41* (2013.01); *G06F 8/423* (2013.01);

(Continued)

(58) Field of Classification Search
CPC ... G06F 8/427; G06F 8/37; G06F 8/41; G06F 8/423; G06F 8/443; G06F 21/14

(Continued)

(56) References Cited

U.S. PATENT DOCUMENTS

| | | | |
|---|---|---|---|
| 5,535,391 A | 7/1996 | Hejlsberg et al. | |
| 7,047,521 B2 * | 5/2006 | Bunnell | .............. G06F 11/3466 |
| | | | 717/130 |

(Continued)

FOREIGN PATENT DOCUMENTS

| | | |
|---|---|---|
| EP | 3161642 B1 | 7/2020 |

OTHER PUBLICATIONS

Pichler et al, "Fast and Compact: Reducing Size of AOT-Compiled Java Code without Sacrificing Performance", ACM, pp. 1-12 (Year: 2025).*

(Continued)

*Primary Examiner* — Anil Khatri
(74) *Attorney, Agent, or Firm* — Silicon Edge Law Group LLP; Kevin J. Clark; Arthur J. Behiel

(57) ABSTRACT

Construct-modification tags conveying development-phase compiler requests are introduced into source code to facilitate communication between developers, identify areas that need developer attention, send directives to a compiler, and other development features in an integrated development environment, during the software development phase. A CANDIDATE tag conveys a request to a compiler to identify multiple candidate constructs, compile each set of candidates or sets of multiple candidates into executables, and profile the compiled executables. Results of the profiling can be compared and a best candidate or set of candidates selected based on one or more of various criteria. A CANDIDATE tag may incorporate properties, permissions, and generate notifications. Methods ensure that tags no longer (Continued)

remain in source code once the software development process enters the production phase.

16 Claims, 19 Drawing Sheets

Related U.S. Application Data

(60) Provisional application No. 63/494,260, filed on Apr. 5, 2023.

(52) U.S. Cl.
CPC .............. G06F 8/433 (2013.01); G06F 8/443 (2013.01); G06F 21/14 (2013.01)

(58) Field of Classification Search
USPC .................................................. 717/129–151
See application file for complete search history.

(56) References Cited

U.S. PATENT DOCUMENTS

| | | | | |
|---|---|---|---|---|
| 7,805,707 | B2 * | 9/2010 | Pouliot | G06F 11/0748 |
| | | | | 717/124 |
| 8,117,587 | B1 * | 2/2012 | Testardi | G06F 11/3624 |
| | | | | 717/100 |
| 10,296,350 | B2 * | 5/2019 | Mizrahi | G06F 9/3838 |
| 10,296,587 | B2 * | 5/2019 | Heck | G06F 40/35 |
| 10,558,437 | B1 * | 2/2020 | Denisenko | G06F 30/337 |
| 10,698,668 | B1 * | 6/2020 | Pohlack | G06F 8/71 |
| 10,809,989 | B2 * | 10/2020 | Kibel | G06F 8/60 |
| 10,853,041 | B2 * | 12/2020 | Tsingauz | G06F 11/36 |
| 10,853,125 | B2 * | 12/2020 | Ganesan | G06F 9/5044 |
| 11,928,447 | B2 | 3/2024 | Drepper | |
| 12,367,023 | B2 * | 7/2025 | Goodwin | G06F 8/434 |
| 12,505,205 | B1 * | 12/2025 | Mekdad | G06F 21/54 |
| 2008/0104574 | A1 | 5/2008 | Mak et al. | |

OTHER PUBLICATIONS

Xu et al, "Copy-and-Patch Compilation", ACM, pp. 1-31 (Year: 2021).*
Dmitriev, "Profiling Java Applications Using Code Hotswapping and Dynamic Call Graph Revelation", ACM, pp. 1-13 (Year: 2004).*
Furr et al, "Profile-Guided Static Typing for Dynamic Scripting Languages", ACM, pp. 1-18 (Year: 2009).*
In view of *McKesson Information Solutions* v. *Bridge Medical* (Fed. Cir. 2007), the applicant wishes to inform the Examiner that the above-identified pending application is a related to U.S. Appl. No. 18/423,784, filed Jan. 26, 2024 (the '784 application).
In view of *McKesson Information Solutions* v. *Bridge Medical* (Fed. Cir. 2007), the applicant wishes to inform the Examiner that the above-identified pending application is a related to U.S. Appl. No. 18/424,490, filed Jan. 26, 2024 (the '490 application).
In view of *McKesson Information Solutions* v. *Bridge Medical* (Fed. Cir. 2007), the applicant wishes to inform the Examiner that the above-identified pending application is a related to U.S. Appl. No. 18/424,527 , filed Jan. 26, 2024 (the '527 application).
In view of *McKesson Information Solutions* v. *Bridge Medical* (Fed. Cir. 2007), the applicant wishes to inform the Examiner that the above-identified pending application is a related to U.S. Appl. No. 18/424,584 , filed Jan. 26, 2024 (the '584 application).
In view of *McKesson Information Solutions* v. *Bridge Medical* (Fed. Cir. 2007), the applicant wishes to inform the Examiner that the above-identified pending application is a related to U.S. Appl. No. 18/424,614, filed Jan. 26, 2024 (the '614 application).
Wikipedia, "Directive (programming)," retrieved from "https://en.wikipedia.org/w/index.php?title=Directive_(programming)&oldid=1195498757", last edited on Jan. 14, 2024, at 02:48 (UTC) (4 pages).
"javadoc", https://docs.oracle.com/javase/8/docs/technotes/tools/windows/javadoc.html#CHDJGIJB, accessed Feb. 16, 2023 (56 pages).
Wikipedia, "Hashtag," retrieved from "https://en.wikipedia.org/w/index.php?title=Hashtag&oldid=1220682870", last edited on Apr. 25, 2024, at 08:12 (UTC) (11 pages).
Wikipedia, "HTML element," retrieved from "https://en.wikipedia.org/w/index.php?title=HTML_element&oldid=1220631624", last edited on Apr. 24, 2024, at 23:44 (UTC) (32 pages).
"The Javadoc Tags Explained," https://www.javaguides.net/2018/12/the-javadoc-tags-explained.html, accessed Feb. 6, 2023 (7 pages).
"Using Java Documentation Comments," https://www.javaguides.net/2018/12/using-java-documentation-comments.html, accessed Feb. 6, 2023 (8 pages).
Wikipedia, "Tag (metadata)," retrieved from "https://en.wikipedia.org/w/index.php?title=Tag_(metadata)&oldid=1220690582", last edited on Apr. 25, 2024, at 09:34 (UTC) (12 pages).

* cited by examiner

400

500

500

700

800

1100

1500
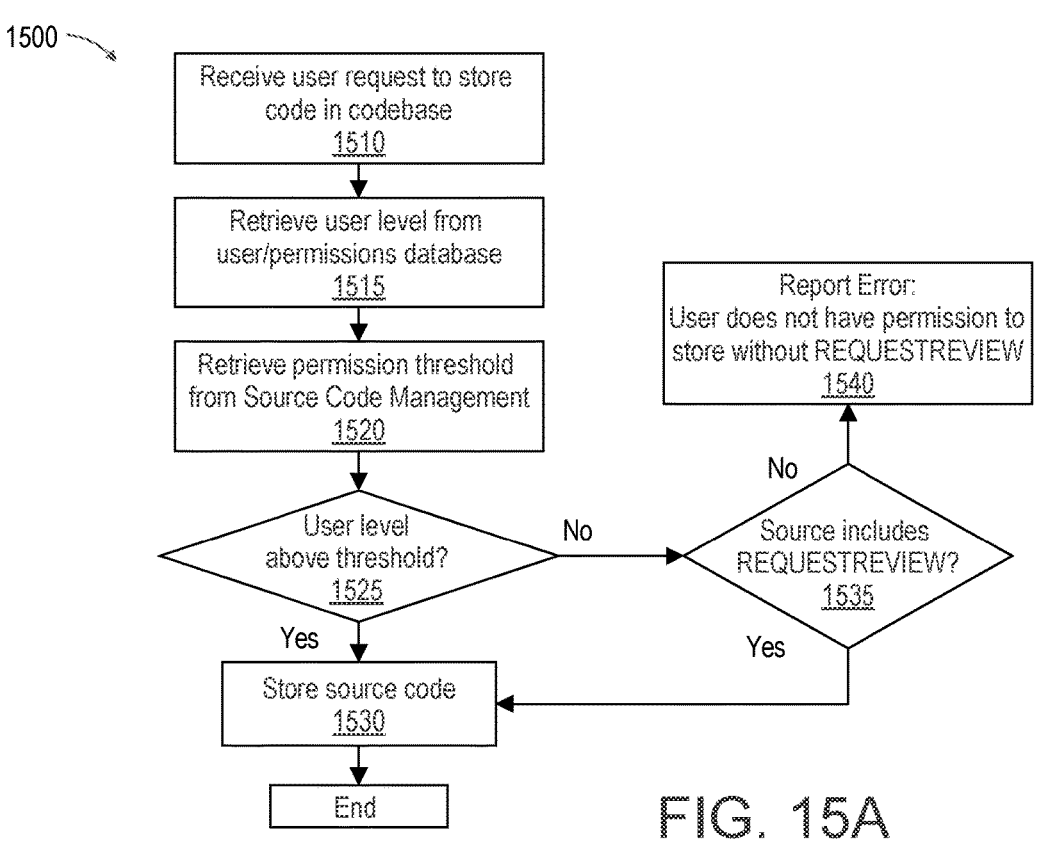
FIG. 15A
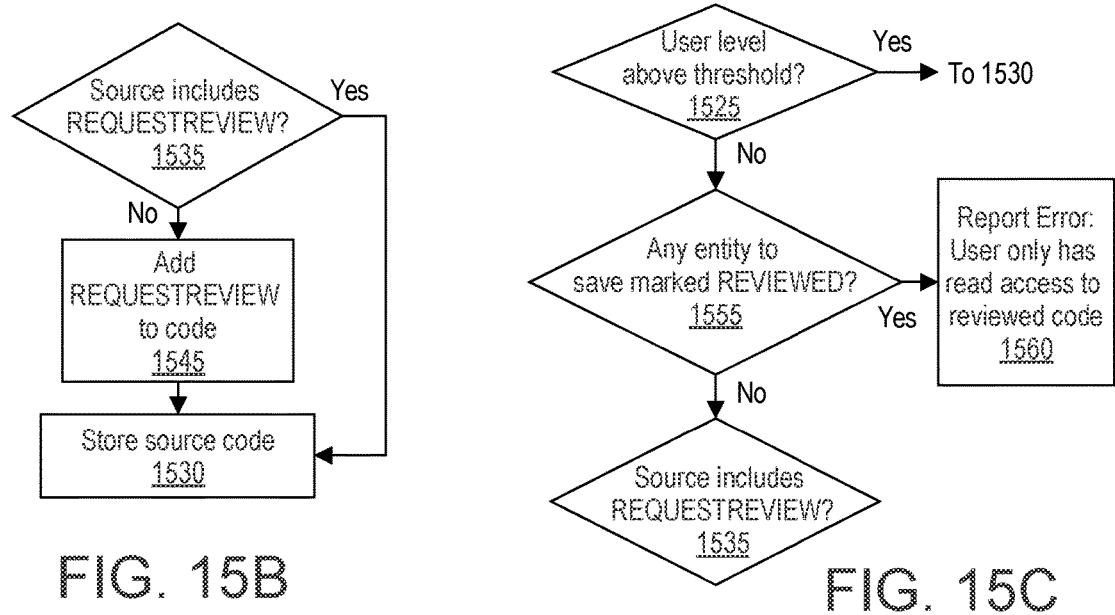
FIG. 15B
FIG. 15C

1600

Receive REQUESTREVIEW
1610

Set review count for
code/user to zero
1615

Send message to reviewer
1620

Recieve reviewer response
1625

REVIEWED?
1630

Yes

No

Increment review count
1635

Review
Count > Max?
1640

Yes

Report Error:
Review count exceeded
1645

No

Send message to requester
1650

Retain REQUESTREVIEW
1660

Send message to reviewer
1655

Receive updated code
from author
1665

End

CONSTRUCT-ASSOCIATED CANDIDATE TAG FOR DEVELOPMENT-PHASE COMPILER REQUESTS

CROSS REFERENCE TO RELATED APPLICATIONS

This application is related to U.S. Provisional Application 63/494,260 filed 5 Apr. 2023 and Indian Provisional Application 202341011006 filed 17 Feb. 2023, both entitled "TAGS FOR PROGRAMMING LANGUAGE", which are incorporated herein by reference.

FIELD OF THE INVENTION

Embodiments of the present disclosure are related, in general, to software development.

BACKGROUND

Modern Integrated Development Environments (IDEs) and compiler systems are sophisticated tools that have revolutionized the way developers create, test, and deploy software. They are designed to streamline the development process, making it more efficient and less error prone.

An IDE is a software suite that consolidates the basic tools needed to write and test software. Modern IDEs come with a source-code editor, build-automation tools, and a debugger. Some also include features like intelligent code completion, syntax highlighting, and code refactoring, which help developers write clean, efficient code. They often support multiple programming languages and provide a unified interface for developers to write, compile, debug, and run their code.

Compiler systems transform the source code written by developers into executable programs. Modern compilers do more than just translate code from one language to another. They also optimize the code to make the resulting program run more efficiently including support for multiple target platforms with different operating systems or hardware architectures. They often come with extensive debugging and profiling tools. These tools help developers identify and fix performance bottlenecks in their code, making it easier to create efficient, high-performance software.

One of the defining characteristics of modern IDEs is their extensibility. They often come with plugin systems that allow developers to add new features or support for additional programming languages. This extensibility makes them adaptable to a wide range of development needs. Furthermore, many IDEs offer cloud-based versions, enabling developers to work from anywhere and collaborate with others in real-time.

Even so, software development remains complex, welcoming improved collaboration between codevelopers in different locations and with different skill sets. Improvements to facilitate rapid code review, prototyping, profiling, as well as techniques to promote discipline and uniform programming style make it easier for developers to write, test, and deploy quality new software.

BRIEF DESCRIPTION OF THE DRAWINGS

The subject matter disclosed is illustrated by way of example, and not by way of limitation, in the figures of the accompanying drawings and in which like reference numerals refer to similar elements and in which:

FIGS. 15A-C depict flowchart 1500 illustrating user permissions being used along with tags REQUESTREVIEW and REVIEWED by the IDE.

DETAILED DESCRIPTION

Figure 1:
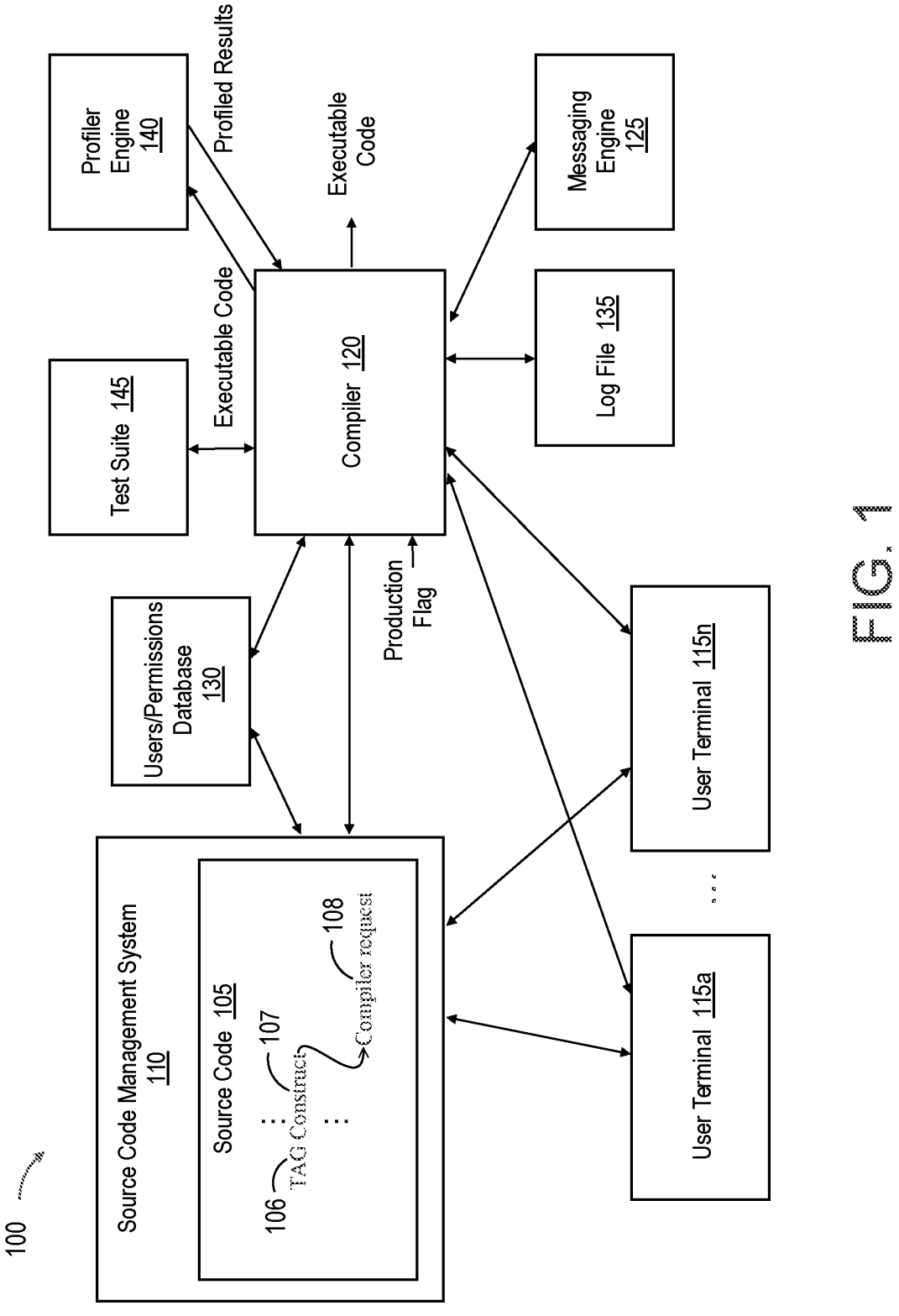
FIG. 1 depicts an example embodiment of an Integrated Development Environment (IDE) 100.

A set of keywords, or "tags," can be introduced into source code to facilitate communication between developers, identify areas that need developer attention, send directives to a compiler, and other development features in an integrated development environment, during the software development phase. Methods ensure that tags no longer remain in source code once the software development process enters the production phase.

Programming languages are designed with their own set of keywords, so tag keywords should be selected that are distinguishable from those inherent in the language. For example, a tag can be any string of one or more characters or symbols, including spaces, so long as it is distinguished from programming language keywords. In this context, a "construct" refers to a particular syntactic structure or a piece of code that performs a specific task. Programming language constructs are the basic building blocks of a program, and they can include various elements such as data types (integers, strings, etc., as well as user-defined), variables, operators, control structures (if statements, for loops, while loops, etc.), functions and procedures, classes and objects, modules and packages, and exception handling constructs. A construct may be comprised of multiple constructs, such as a block of code. Each programming language has its own set of constructs, and the way these constructs are used can vary from one language to another. Tags can be used with any programming language and can be applied to various constructs of the language.

Source code is typically written in a high-level programming language, which is designed to be easy to read and understand. Intermediate representations and machine code are written in more compact and efficient lower-level languages. An intermediate representation generated from one form of source code can itself be a form of source code. The methods detailed herein can be applied to the original source code or various levels of source code derived therefrom. A keyword from one form of source code may be transformed to or represented by a different keyword, numerical value, or token when processed into another form of source code or intermediate representation. A reference to a particular keyword in the methods, systems and devices described herein applies equally to any transformation or alternate representation. The embodiments described herein use keywords chosen to illustrate various aspects of tags. Those of skill in the art will readily substitute alternate keywords (which may or may not also be illustrative in any language) which simply should be differentiable from keywords of the programming language or languages being employed.

Tags are embedded in source code. The use of tags also allows developers to better manage software development in various phases of the development cycle. Tags provide a conversation/communication between developers and offer directives to the compiler during development. They are completely removed by the time production code is released. A keyword identifies a type of tag, and a tag can further include other keywords and phrases and may be augmented with one or more properties. A tag is associated with a construct, in other words modifies that construct, so a tag may be referred to as a construct-modification tag conveying a compiler request.

Tag Properties

In an example embodiment, tags are identified with all capital letters to differentiate from programming language text in the source code. Tags can also have properties associated with them. Properties may have defaults and may be optional. These properties can help contextualize why a tag has been added for a particular portion of source code. They help the developer to communicate metadata about the tag to readers and co-developers (e.g., what to fix, how to optimize, why it is ignored, who added the tag and when the tag is added). Properties may also be used with compiler directives.

Example tag properties include Deadline, Reason, Author, Timestamp, Until, Priority, and Suggestion. The Deadline, Timestamp, and Author have default values assigned to them if values are not provided by a developer. The default value for Author is the name of the current user, as captured by a build system using an authentication method during the login process. The default value of the Timestamp is the current system time (date and time), captured from the system clock information. For Deadline, a default value may be one month from the current date, for example. The Reason, Until, Priority, and Suggestion are optional properties that may be provided by the developers, as needed. In the following code snippets, a generic tag labeled TAG is used to show example tag syntax. Naturally, those of skill in the art will recognize that alternate tag labeling schemes (and alternate tag names) as well as varying syntax may be deployed in accordance with the aspects detailed below.

This code snippet shows a type definition, Person, before any tag has been added. In the source code, ":=" denotes a type or element declaration and ":" denotes element or object usage. The use of pascal case (PascalCase) for object and element identifiers indicates a declaration and the use of snake case (snake_case) represents object and element usage. The delimiter "#" identifies comments.

```
1    Person:= Type
2       Name:= String
```

Assume the Person type (line 1) that needs to perform 'actions' within a 'time limit' for a particular purpose, as shown in the following. The 'actions' are facilitated using the TAG, whereas the 'time limit' and the 'purpose' can be defined using 'deadline' and 'reason' tag properties for type Person. Tags and their properties can be added directly to a construct in single line syntax:

```
1    TAG(Person, deadline: 2022-07-01, reason: "Does not
     support DOB-based functionality"):= Type
2       Name:= String
```

Alternatively, multi-line syntax can be used (TAG in line 1, and the properties delineating the end of the tag lines 4-5):

```
1    TAG
2    Person:= Type
3       Name:= String
4    deadline: 2022-07-01 ## TAG properties
5    reason: "Does not support DOB-based functions."
```

A variety of exemplary tags are introduced, detailed further below, including IGNORE, DEACTIVATE, OPTIMIZE, FIX, ALTERNATE, PROTOTYPE, REQUESTREVIEW, REVIEWED, CANDIDATE, and BESTCANDIDATE. These tags support different functionalities that are available during the development phase. If a tag is present in the production phase, an error is generated during compilation.

The functionality of IGNORE is like commenting out a construct in the source code. DEACTIVATE is similar to IGNORE, although enhanced in that the semantic and syntactical dependencies of a construct associated with the tag are also deactivated.

OPTIMIZE and FIX identify portions of code which need to be optimized or fixed. In some cases, these tags are added by authors manually, and sometimes they are generated automatically during compiling or profiling. In some cases, a FIX is combined with an ALTERNATE, where the ALTERNATE tag identifies an alternate construct to be used until a FIX construct is fixed. A construct tagged as PROTOTYPE can be used as a placeholder to allow compilation until the tagged construct is more fully developed.

REQUESTREVIEW signals that a construct requires review, typically by a more senior reviewer than the author. Response to a REQUESTREVIEW may be with a REVIEWED tag, or optionally a FIX or OPTIMIZE. CANDIDATE tags can identify multiple candidate constructs, compiled results from which can be compared, and a best candidate selected. A BESTCANDIDATE tag may be used to identify such a candidate.

The accompanying drawings are illustrative and not limiting. The left-most digit(s) of a reference number identifies the figure in which the reference number first appears. The same numbers are used throughout the figures to reference like features and components.

FIG. 1 depicts an example embodiment of an Integrated Development Environment (IDE) 100. Source code management (SCM) system 110 is used to track modifications to a source code repository, in this example, source code 105. SCM 110 tracks a running history of changes to a code base and helps resolve conflicts when merging updates from multiple contributors. Subversion, or SVN, is a centralized version control system distributed under an open-source Apache license, which could be incorporated into SCM system 110, in one embodiment. One or more developers, or other users, interface with SCM 110 to retrieve or store all or part of source code 105 via one or more user terminals 115a-115n. SCM 110 accesses a database 130 containing user and permission information, from which it grants or denies permission to read, write, modify, or delete, for example, to all or parts of source code 105. In an example embodiment, SCM 110 may use tags and/or their properties to regulate access to source code.

Source code 105 includes one or more constructs 107 associated with one or more construct-modification tags 106, each of the tags conveying a compiler request 108. The tags 106 can be read in source code 105 by compiler 120, and associated compiler requests conveyed thereby. The construct-modification tags, or simply tags, introduced previously are illustrated in more detail below.

Compiler 120 may have read and write access to source code 105 via SCM 110. In alternate embodiments, for operational reasons, the compiler may not have write access to the Version Control Platform. If the source code needs to be changed by the compiler, it would be to be on a "local" copy (submitted from a user terminal) rather than the central copy.

A profiler engine 140 examines the executable code to allow optimization for high application performance. It analyzes the memory, CPU, network, power consumption, and other resources utilized by each software component or routine. It can test in a variety of system configurations, and optimize for speed, memory usage, network usage, power efficiency, etc. (performance compliance). Profiler engine 140 runs and evaluates executable (compiled) code from and under the direction of compiler 120.

A test suite repository 145 houses one or more test suites associated with various parts (or all) of source code 105. A user may supply test information to repository 145 via a user terminal 115, and test information may be associated with one or more users. Test information may include input and expected output to verify compiled source code is functionally operational, e.g., producing the correct output given an associated input. It may also include performance specification for performance compliance. Access to the repository may be optionally regulated according to user and permission levels, in similar fashion to SCM 105, or by SCM 105 itself. In an example embodiment, compiler 120 can access the test suite repository to determine the availability of a test suite for one or more processes contained within source code 110, retrieve test suites, including performance specification (for any number of system configurations), and utilize profiler engine 140 for testing accuracy (correct execution) and performance compliance. Compiler 120 can run profiler engine 140 on any number of variations of executable code, record accuracy and performance metrics for each, and provide those results. It can further compare results, select one of a set of candidate variations of source code, and modify source code with the selection accordingly.

During operation, compiler 120 may generate various messages, including errors, or alerts, which may be directed to one user, a group of users, or an entire development team. A variety of means for relaying messages may be deployed in various embodiments. Output may be directed to a log file 135. Messages may be displayed on one or more user terminals 115. A messaging engine 125 may be directed to send messages using any means, for example: email, short messaging service (SMS) and other cellular or web-based messaging tools, including any digital workspace that facilitates communication and collaboration within teams, including providing this functionality for IDE 100 itself. Compiler 120 may also modify source code 105 to affect future compilation iterations, or to convey information to readers of the source code.

The various components detailed for IDE 100 in FIG. 1 are illustrative only. While one or more of the components may be discrete (e.g., one or more user terminals 110), those of skill in the art will recognize that a plurality, even all of the components may be deployed in a single computer, a plurality of computers on a network, and may or may not be combined with special-purpose hardware. Procedures carried out by a compiler may include various types of processing not specifically directed to compiling code from one format into another, i.e. source code to intermediate representation or executable, such as parsing, messaging, partial compilation, or processes related to or tangential to source code compilation. Essentially, a compiler, a processor executing compiler instructions, or any combination of components deployed to create the IDE 100 of FIG. 1, may be characterized by the term compiler as used herein. Databases and storage may be cloud-based, distributed, or stored on a single computer. One prior art system, including computers, networks, cloud storage and user terminals is detailed below with respect to FIG. 22.

A typical application design includes at least two phases: development and production. A production indicator or production flag (PF) is set to indicate when the compiler is in production phase. When not set, the IDE 100 is in development mode. The PF may be used by compiler 120 to ensure all tags are processed and removed before compiling production code.

Overview of Compiler

A compiler is a program that translates source code instructions for performing computational functions into machine code that can be executed by a computer, alternatively referred to as binaries, executable code, execution code, application code, etc. Some languages are not compiled but are rather interpreted. Interpretation differs from compilation in that the interpreter executes programs directly from source code without producing a standalone executable. The following discussion focuses on compilers, but those of skill in the art will recognize compiling source code to an executable that is run on a computer can be substituted with a process of interpreting the source code while running on an interpreter.

Program execution generally takes place on computer hardware in a runtime environment. The computer hardware comprises processors, memory, and storage. The runtime environment is a set of software tools and resources that runs on the computer hardware to execute a program. The runtime environment includes the operating system, libraries, and other components that are necessary for the program to run. Computer hardware and runtime environments are well known to those of skill in the art, and an example of the prior art is detailed below in FIG. 22.

Figure 2:
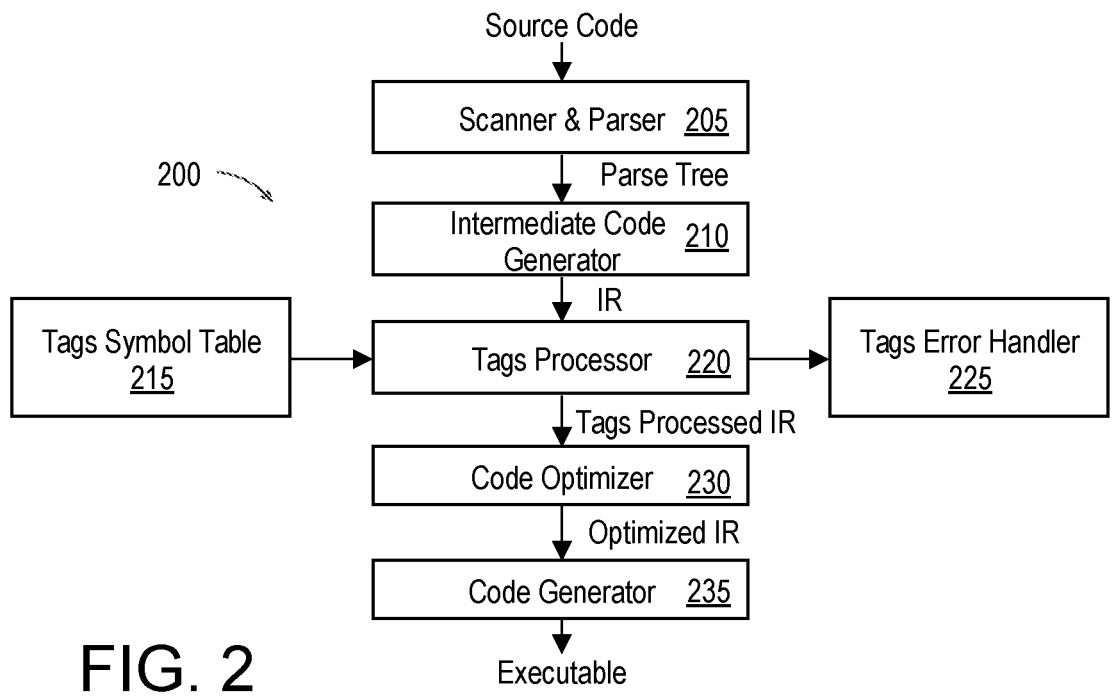
FIG. 2 is a flowchart 200 illustrating how a compiler passes through several phases to convert source code written in a high-level language embedded with tags into machine code.

FIG. 2 is a flowchart 200 illustrating how a compiler passes through several phases to convert source code written in a high-level language embedded with tags into machine code. Initially, the compiler scans and parses the source code (205) to generate a parse tree. The generated parse tree is then fed to an intermediate code generator (210) from which an Intermediate Representation (IR) of the source code is obtained. The IR serves as an input to the tags processor phase (220), which handles the processing of tags in the source code to produce the tags processed IR. The tags symbol table (215) data structure is a portion of a symbol table which is accessible in all the phases of the compilation process. It maintains all the keywords corresponding to the language tags. In the tags processor phase, tags error handler (225), a subset of an error handler (well known in compiler design), generates appropriate error messages with respect to tags. The tags processed IR serves as an input to the code optimization phase (230) from which the optimized IR is obtained. A code generator (235) then creates an executable, or executable code, or binary, specific to a target processor.

As described previously, the compiler operates in either a development or production environment, which is signified by a Production Flag (PF). The PF can be set as a variable within the source code itself, in a configuration file, or using alternative techniques well known in the art. The PF is checked at various times throughout the compilation process for proper tag processing. The build system, e.g., IDE 100, requires that all the tags be resolved before the code moves into the production stage.

Figure 3:
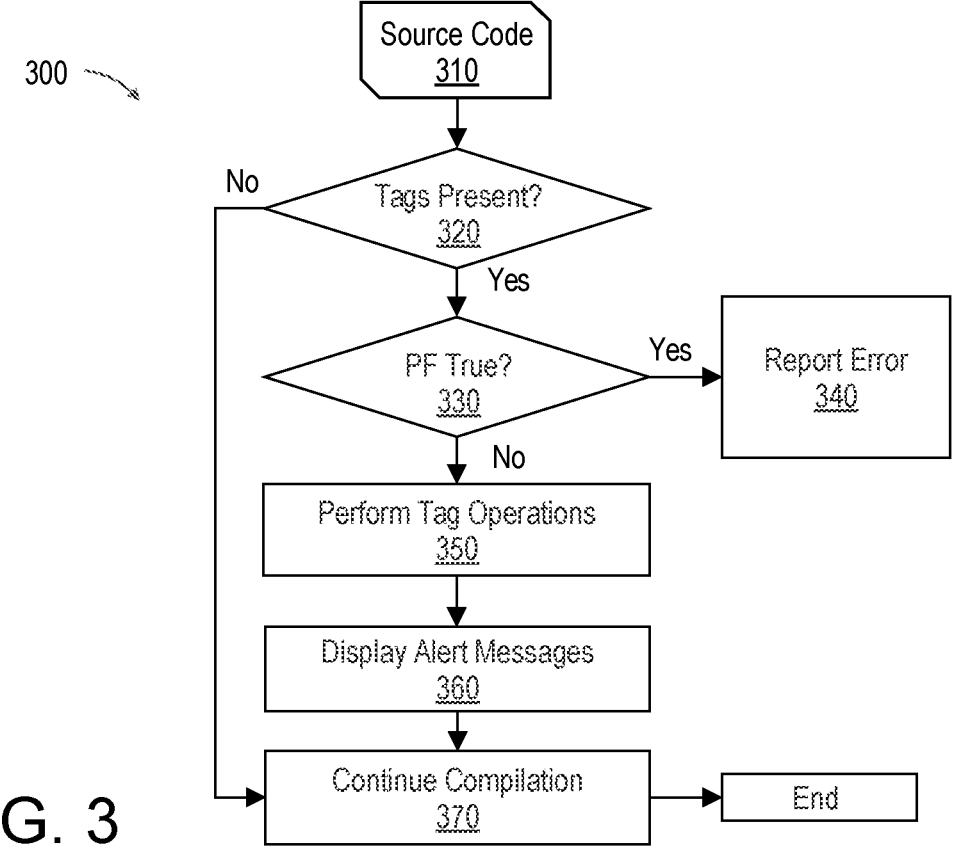
FIG. 3 shows a high-level generalized flow diagram for processing tags.

FIG. 3 shows a high-level generalized flow diagram for processing tags. After getting the source code (310), the compiler checks for the presence of tags (320). When encountering any tags, the tags processor (220) checks whether PF is set as "TRUE" or "FALSE". If PF is set to TRUE, the compiler generates an error message indicating tags are not allowed in the production phase, and compilation stops. This ensures that no production code is generated with the existence of any residual tags, and that all tag-identified issues or required optimizations have been resolved. When the PF is set as "FALSE", the compiler performs the intended operation or action for the various tags (350), generates any appropriate alert messages (360), and continues with further compilation (370) until compilation completes.

An alert message is a variant of a compiler message. An alert message may indicate the presence of a tag, various attributes relating to the tag, and other information to facilitate the code development process, as detailed further below. A compiler with alert message functionality can support general messages for all developers, or personalized alert messages for tag authors or other targeted recipients, such as when a developer is requested to review code. Example alert messages are detailed further below.

The following sections detail more fully the tags introduced previously:

IGNORE

IGNORE(X) has an effect equivalent to a portion of source code being commented out when compiled in the development phase. IGNORE can be used on a single keyword or construct, or on a block of code. There are several advantages of using the IGNORE tag in source code. A convenient shorthand, by enclosing a construct with an IGNORE tag, the compiler automatically detects the scope of the entity and discards it during compilation. In addition, the build system prohibits the ignored code going into production. Incorporating IGNORE into the programming practice promotes uniformity, enforces discipline, provides context information to the development team, and facilitates managing the source code.

During the software development process, some developers may have the habit of commenting out code, while others may remove the code entirely. The practice of using IGNORE instead of commenting avoids mistakes like forgetting to uncomment or replace code. Instead, comments can be used for their primary purpose, which is to document source code. By using the IGNORE tag, the developer's intent is clearly understood by the compiler. Therefore, the compiler can now warn developers before the production stage that there is ignored code.

The following code snippets illustrate examples of the IGNORE tag. In the first, the IGNORE tag is applied to the type named "Z" (line 1), for which the entire block (the type and all its components) is discarded by the tags processor during compilation. In the second, the IGNORE tag is applied to a single element, Element1 (line 2) of the type, which discards that particular element. Ignoring a type:

```
1          IGNORE(Z):= Type
2              Element1:= Number
3              Element2:= String
```

Ignoring an element of a type:

```
1          Z:= Type
2              IGNORE(Element1):= Number
3              Element2:= String
4              Element3:= Number
```

The IGNORE tag can be extended to function conditionally. The IGNORE tag with condition operates only if the defined condition gets satisfied. Otherwise, the entity is not ignored. In the following example, an IGNORE tag without condition for type Person (line 1) is illustrated, along with tag properties such as author and a reason why the code should be ignored.

```
1    IGNORE(Person, author: "ABC", reason: "this functionality is not
     required"):= Type
2        Name:= String
3        Age:= Number
```

In the following snippet, IGNORE with condition is illustrated. In this example, the properties include an 'until' property. An 'until' property is an example of the construct-modification tag (IGNORE in this instance). Any until condition may be deployed in various embodiments. Examples include date, phase of program life cycle, or particular code version. Conditions may be associated with status of other code sections or keywords, for example awaiting certain code to be fixed or optimized. In this illustration, the code for type Person is ignored until a specific date.

```
1    IGNORE(Person, author: "ABC", until: 2023-12-31):=Type
2       Name:= String
3       Age:= Number
```

Figure 4:
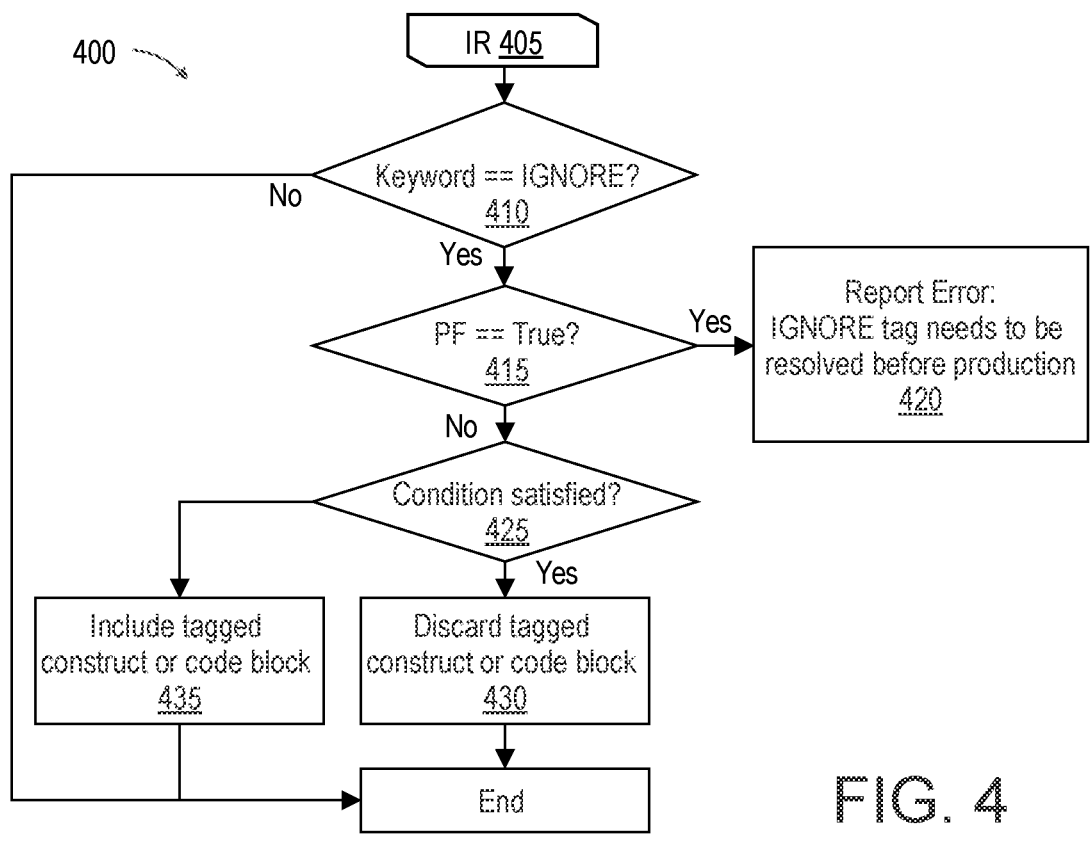
FIG. 4 is a flowchart 400 illustrating a compiler processing an IGNORE tag.

FIG. 4 is a flowchart 400 illustrating a compiler processing an IGNORE tag. As described above, during compilation, the compiler generates a parse tree from the source code, and cycles through the parse tree until all the statements are evaluated. Multiple passes may be required. For each of the flowcharts illustrating tag functions below, these details are not shown, but rather serve to highlight aspects of each tag. As the compiler is processing a keyword of IR code 405, it checks whether it is an IGNORE tag (410). If not, this process completes, and the compiler continues to compile remaining next statements. If it is an IGNORE tag, then the production flag (PF) is checked (415). If it is set then the compiler quits, and an error is reported (420) indicating that an IGNORE tag needs to be resolved before production. In an embodiment supporting IGNORE with condition, then if a condition is specified in the IGNORE tag, that condition is tested (425). If the condition is not met, the IGNORE tag has no effect and the compiler will include the tagged code in continued compilation (435). If the condition is met (or in an embodiment without condition), the construct or code block tagged by the IGNORE tag is discarded (430) and the compiler continues to compile remaining statements. Using the above examples as illustrations, if the construct tagged as IGNORE is a type, then the type whose scope is identified in the scanner and parser phase will be discarded. If IGNORE is applied to a type element, then the compiler will discard just that element.

DEACTIVATE

The DEACTIVATE tag operates similarly to IGNORE, except that, in addition to ignoring the tagged construct, the compiler will fetch and deactivate all the syntactic and semantic dependencies associated with a construct being deactivated using the DEACTIVATE tag. DEACTIVATE, like IGNORE, can be used with or without conditions.

In one embodiment, the construct includes any element/construct of the source code that includes a Type, TypeElement, Functions, Collection Set, Expressions and Role Extensions whereas, the 'semantic dependencies' denote the appropriate relationship (used or defined) associated with the deactivated entity. In general, a semantic dependency is a relationship between two pieces of code that impacts the behavior of the program. For example, if one piece of code contains a loop that depends on another piece of code to provide data, the two pieces of code have a semantic dependency.

Examples of semantic dependencies are detailed in U.S. patent application Ser. No. 18/335,035 to Sridhar Vembu et al., filed 14 Jun. 2023 and entitled "Role Extensions For Programming Languages," which is incorporated herein by reference. That document details user-defined link types, extension data types, and role extensions. Semantic dependencies extend the scope, or functionality, of the independent data types. Link types are exemplified by the creation and existence of a DDT type object depending on the creation and existence of the corresponding IDT type object, with the DDT object being inherently linked to the IDT object. However, an IDT object can be persistent in memory even after a corresponding DDT is deleted (unless and until the IDT object is deliberately deleted).

The following code snippet illustrates the general case of DEACTIVATE tag without condition. Type 'Employee' is tagged DEACTIVATE (line 1) and has collection set ContactInfo (line 3), a dependent-link type PermanentEmployee (line 6), where the Employee and ContactInfo are extended in line numbers 8 and 10 respectively. The example uses two expressions 'Machine Verification' (line 12) and 'ReachtoStaff' (line 16). After encountering the DEACTIVATE keyword, the compiler fetches all the semantic dependencies associated with the entity Employee and deactivates the entity and its dependencies from the input source code. Some of the dependencies are as follows:

a) Linked relationship between Employee (IDT) and PermanentEmployee (DDT);

b) Role Extensions (The Employee type is extended, which is shown using " . . . ", the extension indicator);

c) Collection Set (ContactInfo) and IDT's element (EName) is defined in the scope of Employee type; and d) Expressions (Machine Verification and ReachToStaff) uses the DDT.IDT and DDT.Extension object respectively as input parameters.

Thus, the entire code fragment is deactivated, as the deactivated construct entity has dependencies with all other statements of this example source code.

```
1  DEACTIVATE(Employee...):= Type
2        EName:= String
3           ContactInfo{ }
4  Employee/ContactInfo...:= Type
5              Mob:= Number
6  PermanentEmployee:= Employee
7  AnnualIncrement:= Number                      # Dependent-Link Element or a
   Private Element
8     ...Employee
9                MachineNumber:= String
10      ...ContactInfo
11                OfficeExtension:= Number
12 MachineVerification:= Expression              #Sysadmin invokes this expression.
13    parameter
14                Input: permanent_employee.employee      # Dep.Indep object
15                return
16 ReachToStaff:= Expression #Office Administrator invokes this expression.
17         parameter
18                Input: permanent_employee.contactinfo      ## Dep.Ext object
19                return
```

Figure 5A:
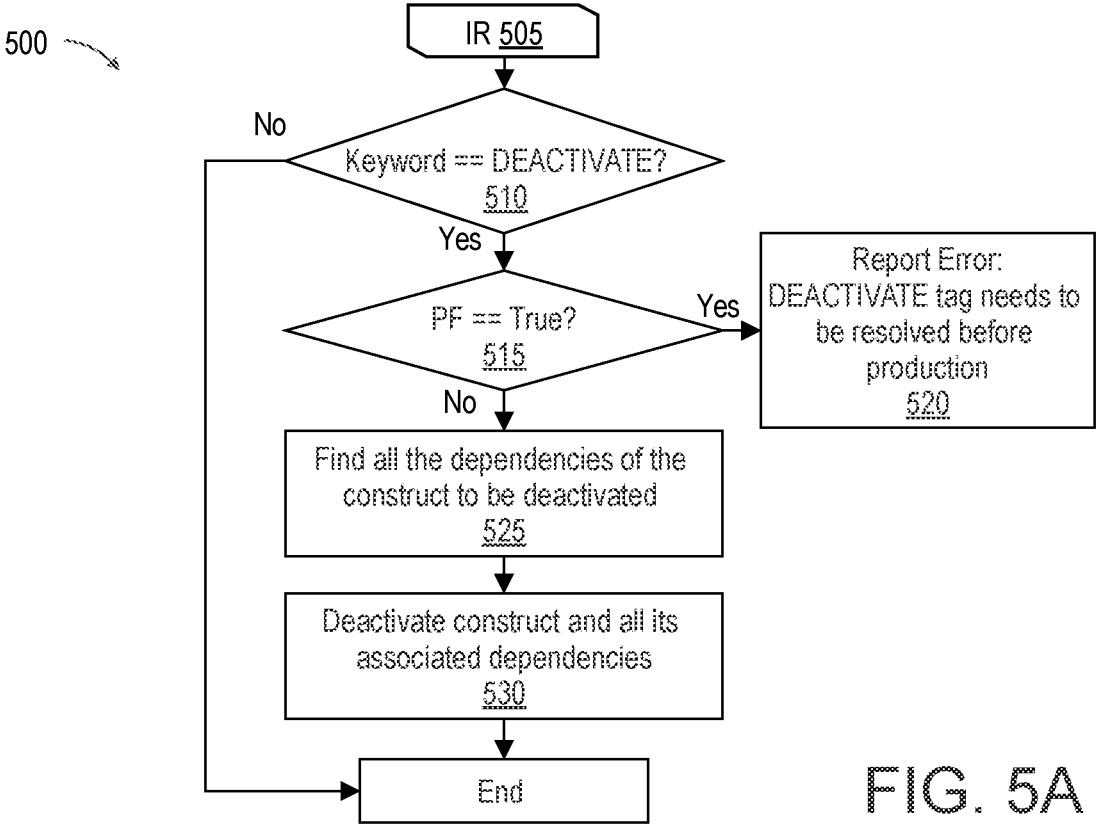
FIGS. 5A and 5B depict flowchart 500 illustrating a compiler processing a DEACTIVATE tag.

FIG. 5A is a flowchart 500 illustrating a compiler processing a DEACTIVATE tag. As the compiler is processing a keyword of IR code 505, it checks whether it is a DEACTIVATE tag (510). If not, this process completes, and compiler continues to compile remaining next statements. If it is a DEACTIVATE tag, then the production flag (PF) is checked (515). If set, the compiler quits, and an error is reported (520) indicating that a DEACTIVATE tag needs to be resolved before production. Otherwise, the compiler finds all the dependencies of the tagged construct (525) and deactivates the construct and all its associated dependencies (530).

Syntax for the DEACTIVATE with condition is: DEACTIVATE (Construct, Condition). Alternate embodiments may include additional properties. The condition can be provided using an 'until' tag property, which operates as detailed previously with the IGNORE tag. The DEACTIVATE tag operates only if the defined condition is satisfied. Otherwise, the construct is not deactivated. Following is illustrative syntax for DEACTIVATE with condition.

---

```
DEACTIVATE(X, until = dd-mm-yyyy):= String
```

---

Here 'X' is the construct that is deactivated and 'until=dd-mm-yyyy' is the condition. When the condition is satisfied, the tags processor deactivates the entity and its associated semantic dependencies. As with IGNORE, any of a variety of conditions can be used in various embodiments. The compiler can generate a personalized alert message to the author as a reminder about the automatic deactivation, if the condition is satisfied, when the code is compiled by the author.

Figure 5B:
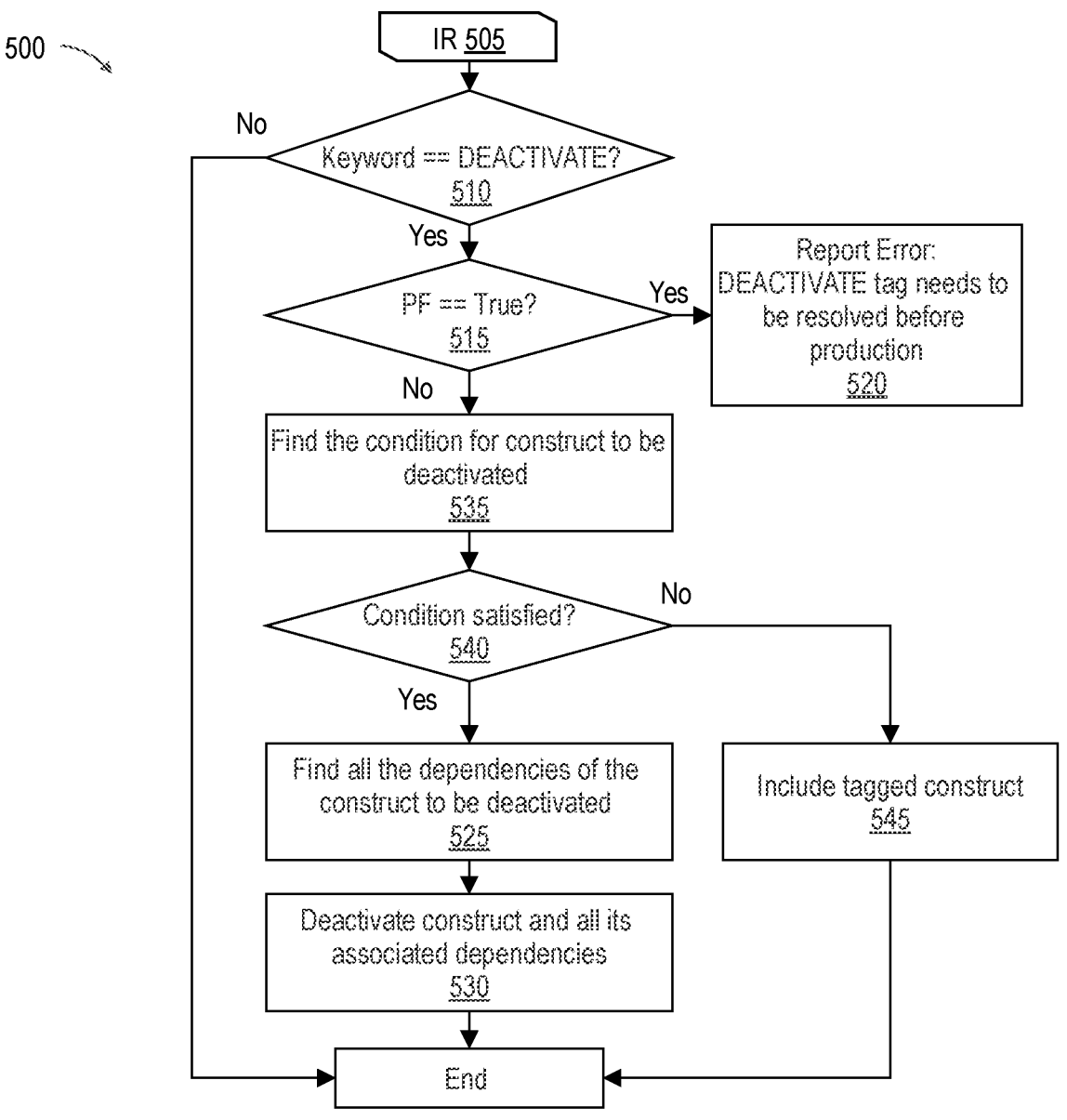

FIG. 5B is an alternate embodiment of flow chart 500 illustrating a compiler processing a DEACTIVATE tag with condition. The operation is identical to the description of FIG. 5A, with the following exceptions. After the PF flag is checked (515), a condition for the tagged construct is located (535). If the test for that condition is satisfied (540), then the deactivation proceeds as detailed above (525). If the condition is not satisfied, then include the tagged construct and its dependencies in the compilation (545).

DEACTIVATE for TESTING

Figure 6:
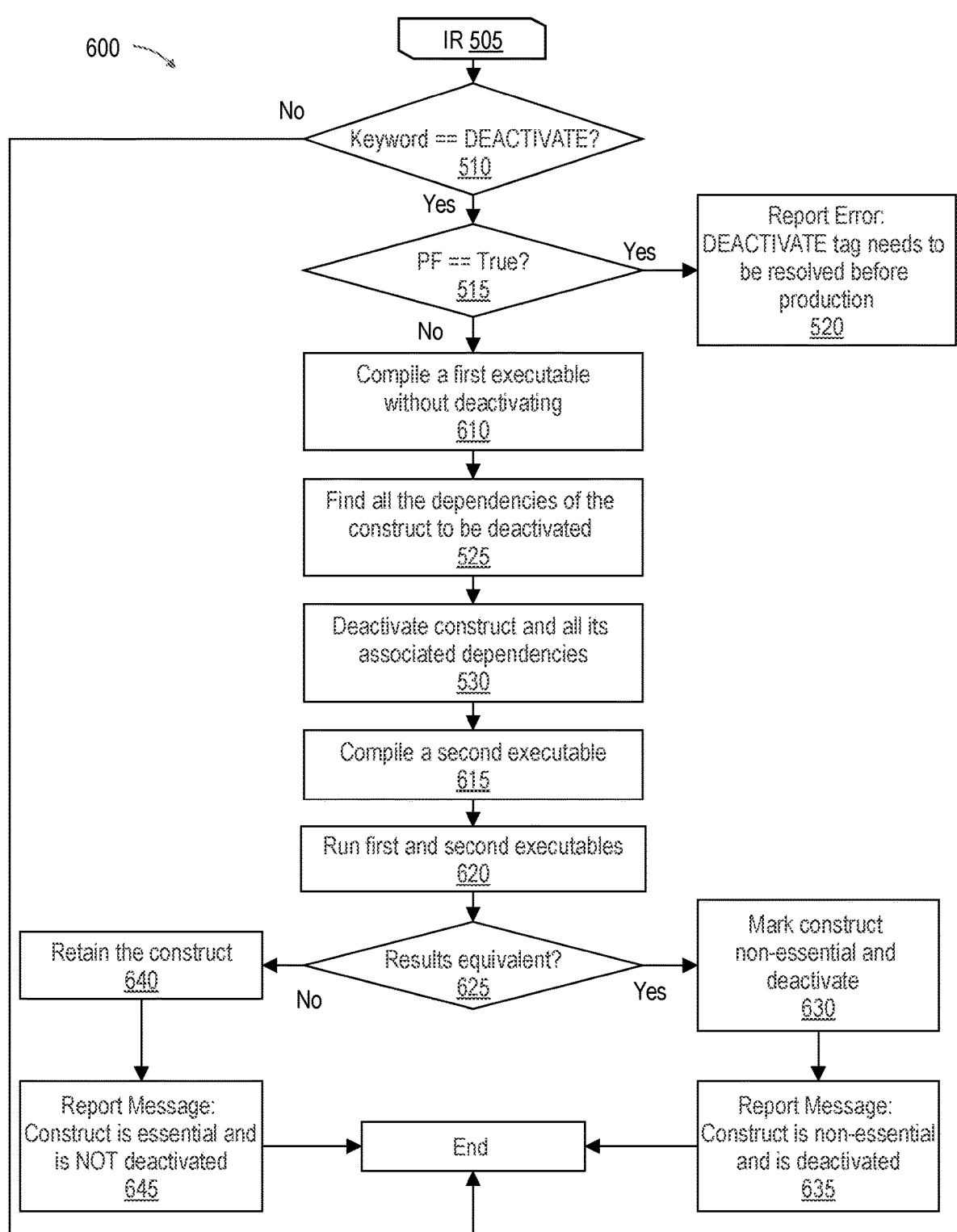
FIG. 6 is a flowchart 600 that illustrates using DEACTIVATE for testing.

FIG. 6 is a flowchart 600 that illustrates using DEACTIVATE for testing. In this embodiment, the compiler will use this tag to compile two executable versions: one with a construct deactivated, and one without. Running both executable versions and comparing the results provides insight into the functionality of the construct. The compiler parses source code, generates IR 505, and checks for the DEACTIVATE tag (510). If no DEACTIVATE tag is found, the process ends. As with other tags, if the PF is set (515), an error is generated indicating that the DEACTIVATE tag needs to be resolved before production. A first executable is compiled while not considering the DEACTIVATE tag (610). Then, the compiler identifies all the dependent statements where the tagged construct is used, as well as all semantic dependencies (525). The construct and all its associated dependencies are deactivated (530) and a second executable is compiled (615). The compiler then checks for the application functionality with and without the deactivated construct at runtime (620). A profiler and/or a test suite may be used to facilitate this. If the application functionality remains the same with and without the construct (625), then the compiler marks the construct as non-essential entity and deactivates it (630). A message (635) may be generated indicating the construct is non-essential and deactivated. Otherwise, the construct is retained (640). A message (645) may be generated to indicate the construct is essential and is not deactivated. Along with either message the compiler may enter information into the tag property in source code to indicate the results of the testing and any actions taken by result. In an embodiment, the compiler may alter the DEACTIVATE tag to another tag, such as FIX or OPTIMIZE in the event that the construct is not deactivated.

Flowchart 600 may be modified (not shown) to test a construct such as an entity with dependent features. If there is a DEACTIVATE tag (510) and the PF flag is not set (515) then the compiler identifies all the dependent features of the entity construct to generate a first and second executable, one with a dependent feature deactivated (530), and one without (610). Testing and comparison (620 and 625) can be deployed to determine if the feature is essential. This may be repeated if the construct has multiple dependent features. If there is no difference in functionality between two executables, then the construct and its dependent feature are deactivated (630). If the dependent feature is shown to have functionality, then the construct is deactivated but the dependent feature is retained for run time. Appropriate messages may be generated, and properties may be updated to indicate the test results.

DEACTIVATE with test may be specified by a developer using the 'until' tag property. For example, consider DEACTIVATE is applied to a type called Entity: DEACTIVATE (Entity, until: 'Test_Output'=Essential):=Type. In this code line, the Entity is the construct that will be deactivated by the compiler until the entity becomes essential. Alternate embodiments may use other techniques to invoke testing with the DEACTIVATE keyword.

OPTIMIZE

An OPTIMIZE tag provides a signal to developers that code needs to be optimized. It can be used when a construct has complete functionality but is not optimal based on performance. The tag may be entered by a developer, perhaps with a suggestion for how to optimize. The developer may apply the OPTIMIZE tag in response to a request for review, as detailed below. The compiler may also amend source code with an OPTIMIZE tag in response to performance metrics from profiling one or more candidate source codes. This tag is used to communicate to developers. In the development environment, the compiler interprets OPTIMIZE(X) to be equivalent to X, where X can be any construct. As with other tags, the build system requires the OPTIMIZE tag to be removed before the code moves into the production stage.

The following two examples illustrate the non-optimal and optimal version of source code for finding an even number. The first is implemented as a function IsEven?. It uses a flip flop which toggles each step in a loop until the number value is reached. Thus, it has O(n) time complexity. So, while it is accurate, it is an example of non-optimal code. It has been tagged with OPTIMIZE to indicate that a faster solution should be explored.

---

```
1    OPTIMIZE(IsEven?):= Function
2        parameter
3            number
4        state
5            FlipFlop?:= Boolean(init: 'True')
6        for_each(Step, in: [1..number])
```

-continued

| 7 | update(flip_flop?: not?(flip_flop?)) |
|---|---|
| 8 | return |
| 9 | flip_flop? |

The following code uses the modulo function with O(1) time complexity. Thus, it is far faster in processing time than the previous. The OPTIMIZE tag has been removed.

| 1 | IsEven?:= Expression |
|---|---|
| 2 | parameter |
| 3 | number |
| 4 | return |
| 5 | number % 2 == 0 |

Figure 7:
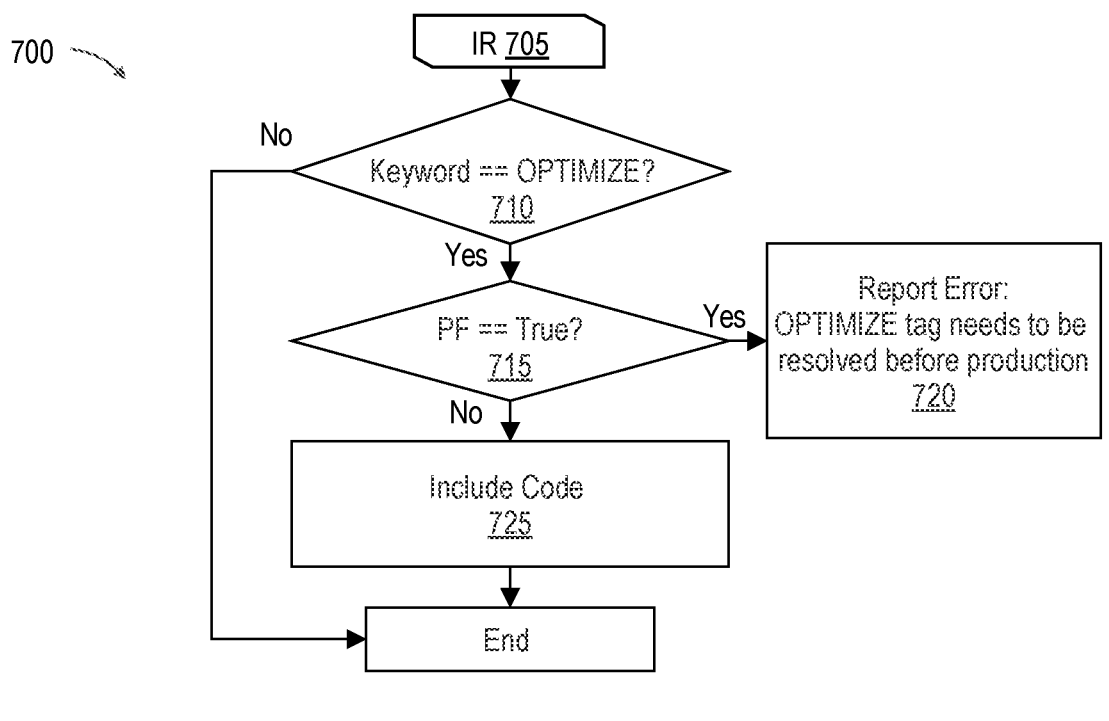
FIG. 7 is a flowchart 700 illustrating a compiler processing an OPTIMIZE tag.

FIG. 7 is a flowchart 700 illustrating a compiler processing an OPTIMIZE tag. As the compiler is processing a keyword of IR code 705, it checks whether it is an OPTIMIZE tag (710). If not, this process completes, and compiler continues to compile remaining next statements. If it is an OPTIMIZE tag, then the production flag (PF) is checked (715). If set, then the compiler quits, and an error is reported (720) indicating that an OPTIMIZE tag needs to be resolved before production. Otherwise, the OPTIMIZE tag has no further effect, and the construct associated with the OPTIMIZE tag is included in the code for continued compilation (725).

FIX

The FIX tag serves as a hint to the developer that a construct needs to be fixed. Perhaps a developer is working with a limitation where full functionality is not completed. It may be due to a missed or forgotten specification requirement or, during rapid prototyping, a feature is intentionally skipped. In the development environment, the compiler interprets FIX(Construct) to be equivalent to Construct during compilation. For whatever reason, a developer can add a FIX tag to a construct (optionally and helpfully including the reason or a suggestion for improvement, in the properties of the tag, when possible). The tag serves as a reminder for developers, as well as prevents production code being generated until the construct is fixed.

To illustrate, the following code snippet shows a Type "Car" (line1) defined with an element "LicenseNumber" as a Number (line 2).

| 1 | Car:= Type |
|---|---|
| 2 | LicenseNumber:= Number |

A developer notices that this element definition is not correct, as it does not support the fact that license plates are alpha-numeric. However, in this scenario, the code still compiles and executes successfully, albeit with a limitation on license plates that are numeric only. The developer does not have to take time immediately to fix the problem, but simply marks the errant construct to be fixed. The following snippet shows the FIX syntax.

| 1 | Car:= Type |
|---|---|
| 2 | FIX(LicenseNumber):= Number |

In due course, the developer (or another developer who may be alerted to the issue via the FIX tag) fixes the code, and removes the FIX tag, as shown below. This code will no longer cause the compiler to throw an error in the production phase.

| 1 | Car:= Type |
|---|---|
| 2 | LicenseNumber:= String(license_number.length == 10) |

Figure 8:
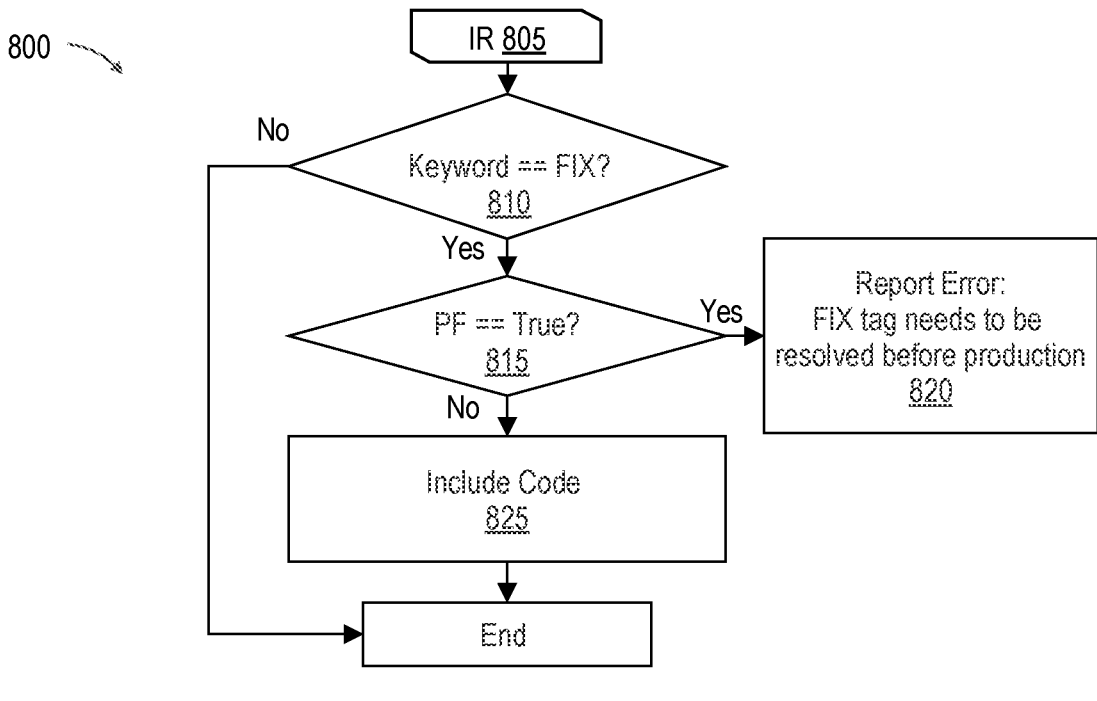
FIG. 8 is a flowchart 800 illustrating a compiler processing a FIX tag.

FIG. 8 is a flowchart 800 illustrating a compiler processing a FIX tag. As the compiler is processing a keyword of IR code 805, it checks whether it has encountered a FIX tag (810). If not, this process completes, and the compiler continues to compile remaining next statements. If it is a FIX tag, then the production flag (PF) is checked (815). If set, then the compiler quits, and an error is reported (820) indicating that a FIX tag needs to be resolved before production. Otherwise, the FIX tag has no further effect, and the construct associated with the FIX tag is included in the code for continued compilation (825), at least for the time being. In an embodiment supporting ALTERNATE tags, it's possible for this FIX construct to be replaced with an alternate version of this construct when an ALTERNATE tag is encountered, a process detailed further below.

FIX with ALTERNATE

The ALTERNATE tag can be used to extend the functionality of the FIX tag. If an ALTERNATE tag is associated with a construct in source code, and there exists a FIX tag associated with another construct of the same name, then the compiler uses the code with the ALTERNATE tag and ignores the code associated with the FIX tag.

In the previous FIX example, the code was incorrect, but did successfully compile, so having the compiler ignore the FIX tag was an effective strategy. However, for illustration, assume that the construct to be fixed did not compile, or otherwise produced results preventing ongoing development. An alternate piece of code identified by the ALTERNATE tag can be inserted for the same construct, perhaps a workaround or partial specification fulfillment that is adequate for the time being. In this case, the compiler will ignore the FIX code and the developer can continue to compile.

To illustrate, in the following code, the entity that needs to be fixed is 'Person' (line 4) which is a type entity tagged with a FIX tag. The reason given for the FIX tag is that middle names are not considered for a type Person, and that could lead to confusion. An alternate code block for type Person is inserted (lines 9-12) and labeled with the ALTERNATE tag as shown. The code tagged by the ALTERNATE tag is a suitable placeholder until the original version of the construct Person type is fixed.

| 1 | Sample:= Module |
|---|---|
| 2 | Person{ } |
| 3 | Team{ } |
| 4 | FIX(Person):= Type |
| 5 | reason: "Middle Name not considered. Confusing for users with middle names" |
| 6 | FirstName:= String |
| 7 | LastName:= String |

-continued

```
8    FullName: person.first_name + " " + person.last_name
9  ALTERNATE(Person):= Type
10    FullName:= String
11    FirstName: person.full_name.split[1](" ") # Not fully correct code
12    LastName: person.full_name.split[2](" ") # Not fully correct code
13 Team:= Type
14    Name:= String
15    Employee{ }
16 Team/Employee:= Person
17    Salary:= Number
18    FormalName: "Mr." + employee.last_name
```

The alternate code in the previous example is similar to the code marked FIX and illustrates a functioning operation to generate a first and last name for several Person entities. However, ALTERNATE can also be used for low-effort code replacement that will satisfy the place of the original version without having to worry about a full-fledged design. Below is another ALTERNATE example simply using initial values to create sample names for type Person. This will allow the code to compile and allow other development work to continue but is obviously not operational as not all persons will have a full name of John Doe.

```
1    ALTERNATE(Person):= Type
2    FirstName:= String(init: "John")
3    LastName:= String(init: "Doe")
4    FullName: "John Doe"
```

An embodiment with FIX and ALTERNATE may be further enhanced with the compiler automatically changing ALTERNATE to IGNORE in the source code after the original entity is fixed. Thus, the alternate code will no longer be used for compilation. There are numerous ways to maintain state from previous compilations that would allow a compiler to determine whether code tagged with FIX has been fixed, which will be apparent to those of skill in the art. One way is to note the presence of an ALTERNATE tag for a particular construct that does not have a FIX tag associated with that construct. The construct is there, but the FIX tag is not. The presumption can be that there had been a FIX tag previously and the code has now been remedied.

The code below shows the earlier example, but with type Person now having a suitable definition, there is no FIX tag associated with it. The compiler, having encountered an ALTERNATE tag (line 11) associated with Person but no FIX (lines1-9) changes the ALTERNATE tag code (lines 11-14) to an IGNORE tag.

```
1 Person:= Type
2    FirstName:= String
3    Optional(MiddleName)
4    LastName:= String
5    FullName:
6      if(exists?(person.middle_name))
7        person.first_name + " " + person.middle_name + " " + person.last_name
8      else
9        person.first_name + " " + person.last_name
10 Person/MiddleName:= String
11 ALTERNATE(Person):= Type
12    FullName:= String
13    FirstName: person.full_name.split[1](" ") # Not fully correct code
14    LastName: person.full_name.split[2](" ") # Not fully correct code
```

The resulting code with the ALTERNATE tag code changed to IGNORE tag code (lines 11-14) is shown below:

```
1 Person:= Type
2    FirstName:= String
3    Optional(MiddleName)
4    LastName:= String
5    FullName:
6      if(exists?(person.middle_name))
7        person.first_name + " " + person.middle_name + " " + person.last_name
8      else
9        person.first_name + " " + person.last_name
10 Person/MiddleName:= String
11 IGNORE(Person):= Type
12    FullName:= String
13    FirstName: person.full_name.split[1](" ") # Not fully correct code
14    LastName: person.full_name.split[2](" ") # Not fully correct code
```

Figure 9:
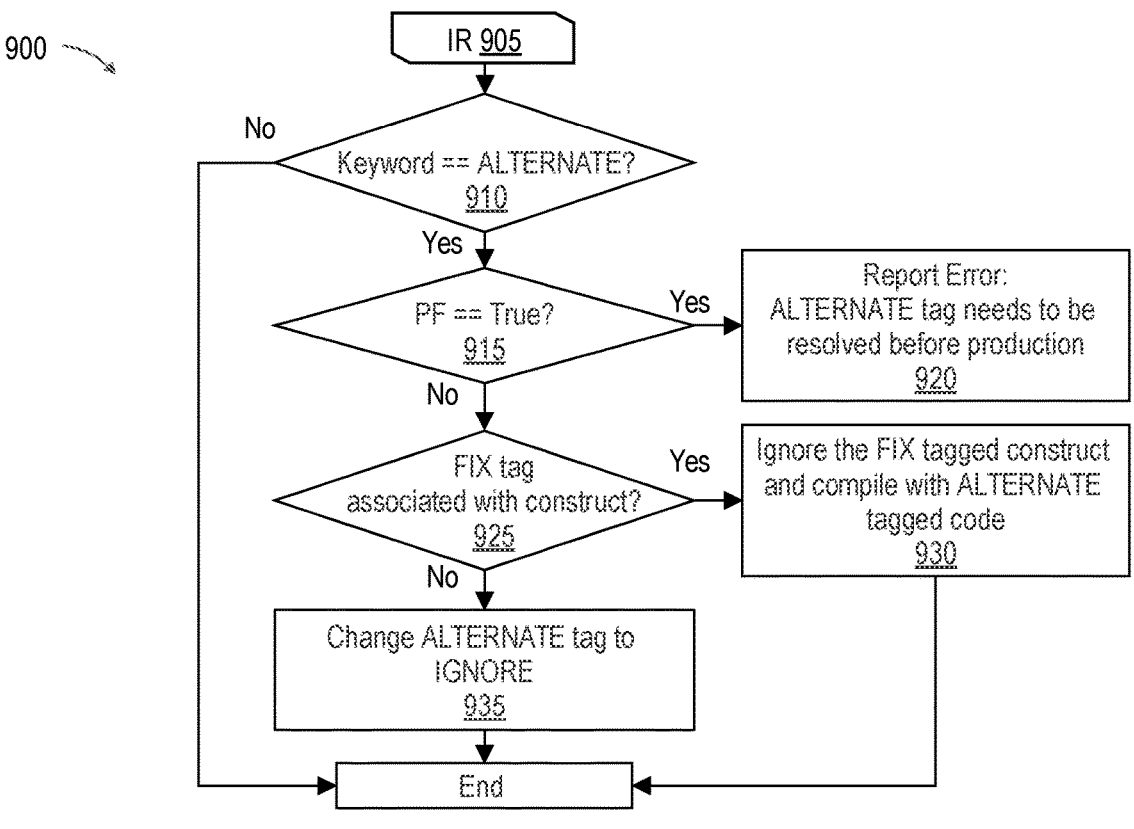
FIG. 9 is a flowchart 900 illustrating a compiler processing an ALTERNATE tag.

FIG. 9 is a flowchart 900 illustrating a compiler processing an ALTERNATE tag. As the compiler is processing a keyword of IR code 905, it checks whether it has encountered an ALTERNATE tag (910). If not, this process completes, and the compiler continues to compile remaining next statements. If it is an ALTERNATE tag, then the production flag (PF) is checked (915), and if it is set then the compiler quits. An error is reported (920) indicating that an ALTERNATE tag needs to be resolved before production. If PF is not set, the compiler continues by locating any FIX tag associated with the ALTERNATE construct. Using the previous example, the ALTERNATE tag was attached to type Person. So, the compiler would locate a FIX tag in the parse tree associated with type Person. If one is found (925), the compiler ignores the FIX tagged construct code and continues compilation with the ALTERNATE tagged construct code. If no FIX tag is found for the construct, in this embodiment, it is presumed that a prior FIX tag has been removed implying the code has been fixed by the developer. The compiler then changes the ALTERNATE tag to an IGNORE tag in the source code (935). Compiling continues with the untagged construct, which is Person in this example. In alternate embodiments, if there is no untagged code for the construct, an error can be generated, or the ALTERNATE code can be used instead (not shown).

The functionality of ALTERNATE can be expanded beyond use with FIX tags. For example, ALTERNATE could be used with OPTIMIZE in the same fashion as detailed above with respect to fix. Those of skill in the art will recognize how to modify flowchart 900 to recognize either a FIX or OPTIMIZE tag associated with a named construct that has been tagged ALTERNATE, and to compile with alternate code instead of the FIX or OPTIMIZE tagged code, respectively. Details not shown.

PROTOTYPE

The PROTOTYPE tag is only valid at compile time, which allows other developers to use the prototype elements as end points in the code base to check compilation. The PROTOTYPE tag is not allowed during run time. Perhaps the functionality of the entity enclosed in PROTOTYPE tag is not complete. Unlike the FIX tag, the input source code in the PROTOTYPE tag is not ignored. The PROTOTYPE tag is useful when dealing with complex problems that require multiple modules (and authors) to communicate. Traditionally, developers would write the prototype first, so that the start and end points for a particular feature would be determined.

The following code illustrates the PROTOTYPE tag, where a full definition is needed for the type ProductCart. A bill for a customer uses a collection type Product contained in the ProductCart type (lines 2-3). The function MakeBill generates a bill for the customer (line 4). It uses a parameter product_cart of ProductCart type and a state variable RunningTotal which is initialized to 0 (lines 5-8). The state variable (running_total) (lines 9-10) is updated in each iteration as the sum of running_total and price_lookup (item), where price_lookup(string) returns the selling price of a Product. The total price of all the products in the product cart is returned (line 12). Even though these functions, variables and types will be available for processing in compilation, instructions will be compiled into the executable code that generate an error if it is run.

```
1   PROTOTYPE(ProductCart):= Type
2       Product[ ]
3   PROTOTYPE(ProductCart/Product):= String
4   MakeBill:= Function
5       parameter
6           product_cart
7       state
8           RunningTotal:= Number(init: 0)
9       for_each(Item, in: product_cart.product[ ])
10          update(running_total, running_total + price_lookup(item))
11      return
12          "Bill Total: " + running_total.to_string
```

Figure 10:
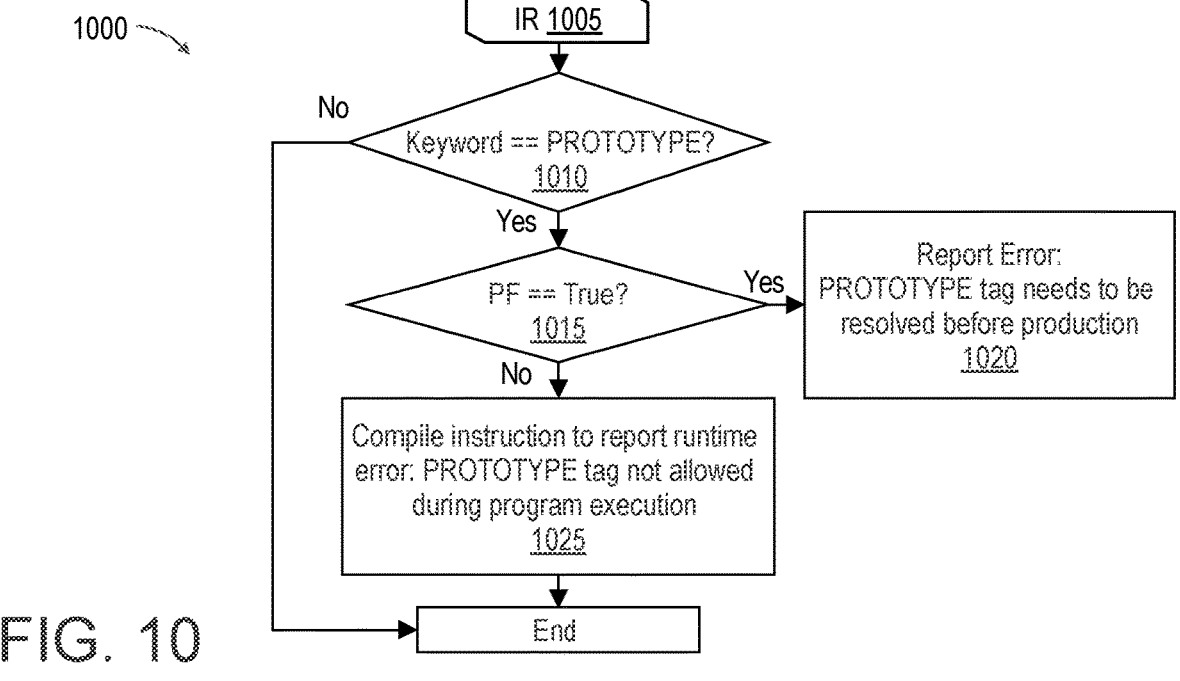
FIG. 10 is a flowchart 1000 illustrating a compiler processing a PROTOTYPE tag.

FIG. 10 is a flowchart 1000 illustrating a compiler processing a PROTOTYPE tag. As the compiler is processing a keyword of IR code 805, it checks whether it has encountered a PROTOTYPE tag (1010). If not, this process completes, and the compiler continues to compile remaining next statements. If it is a PROTOTYPE tag, then the production flag (PF) is checked (1015), and if it is set then the compiler quits. An error is reported (1020) indicating that a PROTOTYPE tag needs to be resolved before production. The construct and associated code tagged by PROTOTYPE are used for compilation in order to test interoperability with other code modules. However, instructions are encoded in the compiled output (1025) to generate an error during runtime if the compiled output is executed. In this example, the error indicates that the PROTOTYPE tag is not allowed during program execution.

REQUESTREVIEW and REVIEWED

Two tags, REQUESTREVIEW and REVIEWED, can be utilized to facilitate communication between developers, and maintain elements of that communication within the source code itself via tags. And as with other tags, they ensure that all such communication is completed and removed before entering the production phase. For example, during software development, there may be novice developers working alongside more senior developers. For illustration, a first developer may be referred to as a junior developer, and a second developer may be referred to as a senior developer. Or, the first user may be an author, and the second is a reviewer. In practice, there can be any number of designations of users and levels within any of a variety of hierarchies, and any requests and reviews may be carried out between any types of users. Such data may be maintained for a development team in a Users/Permissions database 130 as described above.

It may be desirable to allow for addition of newer code developed by junior developers only after a formal verification from senior developers. For this purpose, the REQUESTREVIEW tag is entered into source code to alert a reviewer of the need for review. A reviewer indicates a review request is successfully completed by altering a REQUESTREVIEW tag to the REVIEWED tag. Before the REVIEWED tag is entered, indicating the code is not yet deemed acceptable, a reviewer may utilize one or more FIX and/or OPTIMIZE tags to communicate to the review requester (author). The REQUESTREVIEW and response tags (REVIEWED, FIX and OPTIMIZE) can be applied to any construct including a block of the source programming language. In a general embodiment, these tags may be entered manually by users, automatically by the compiler, or a combination of both. Various levels of regulation of the review process and source code management can be enforced by the IDE to formalize any desired design process methodologies, including user access permissions. REVIEWED tags can be monitored by an administrator manually during the different application versions and removed before moving from one version to the next. Alternatively, automatic removal may take place, controlled by the administrator. Any technique for removal of REVIEWED tags is acceptable. Importantly, the compiler will enforce any non-removed tags prior to entering the production phase.

The following code snippet illustrates the REQUEST-REVIEW syntax. Assume the Person and Employee type are already part of the code base. A junior developer is adding the definition of a new type, Manager, which is having a linked relationship with the type Employee. The new definition is tagged with a REQUESTREVIEW by the junior developer (line 1). The Manager type has two elements Experience and SpecializedDomain (lines 2-3). Experience is a TimeDelta function representing the duration between two dates and SpecializedDomain is a collection element (line 4) with two elements DomainName and Certification respectively. The inclusion of a REQUESTREVIEW tag to the code may be helpful in certain situations, where the developer seeks for a confirmation from the reviewer.

```
1    REQUESTREVIEW(Manager):= Employee
2        Experience:= TimeDelta
3        SpecializedDomain
4        REQUESTREVIEW(SpecializedDomain):= Type
5            DomainName:= String
6            Certification:= String
```

Figure 11:
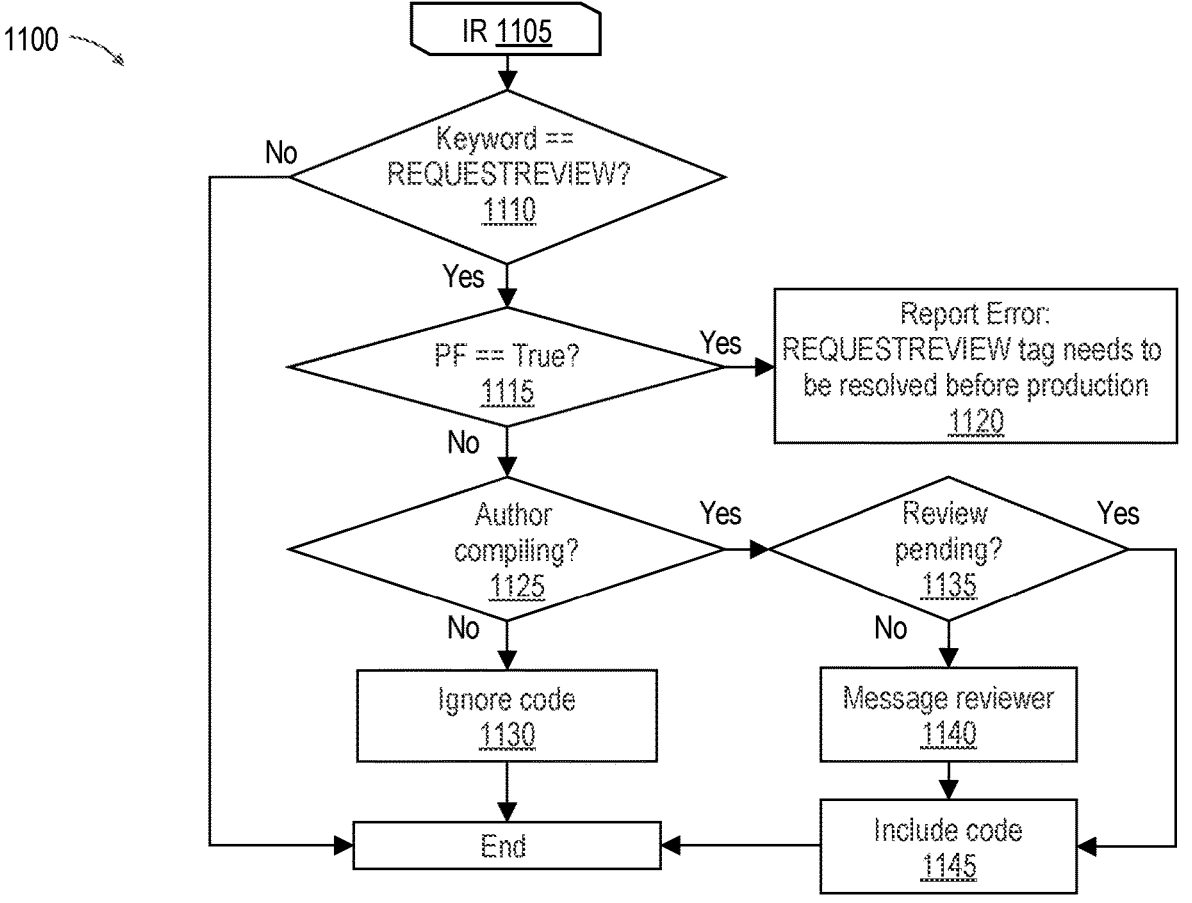
FIG. 11 is a flowchart 1100 illustrating a process for a compiler processing a REQUESTREVIEW tag.

In one embodiment, the IDE allows a developer (junior in this example) to continue editing and compiling their code, while preventing that code from interfering with the code base and the other developers. FIG. 11 is a flowchart 1100 illustrating a process for a compiler processing a REQUESTREVIEW tag. In similar fashion to other tags, the compiler processes a keyword of IR 1105 to determine whether it a REQUESTREVIEW tag (1110). If not, this process completes, and compiler continues to compile remaining next statements. If it is a REQUESTREVIEW tag, then the production flag (PF) is checked (1115), and if it is set then the compiler quits. An error is reported (1120) indicating that a REQUESTREVIEW tag needs to be resolved before production. If the user compiling is not the author of the tagged code, or the reviewer designated according to the REQUESTREVIEW (1125), then the code is ignored (1130), and the compiler continues to compile remaining statements. If it is the author compiling, then unless there is a review already pending (1135), a message will be sent to at least one reviewer (1140). A variety of techniques for determining if a review is pending may be employed. For example, the compiler may save state from previous compilation to recognize that an introduction of the tag is new in the source code and sends the message only in that case. If the tag existed in the previous compilation, it is presumed the message was already sent. Alternatively, a messaging engine may keep state regarding pending requests and any responses received. The compiler may use any messaging procedure, such as those detailed with respect to IDE 100 and messaging engine 125 above. If a review for the construct is already pending, there is no need to send a redundant message to reviewers. In either case, the compiler includes the tagged code and continues the compilation process with any remaining statements.

After receiving a message or other notification of the request for review, the reviewer conducts the review and will accept the code in its current form, indicate a change is required, or take more time. If the reviewer leaves a REQUESTREVIEW tag as it is, then the review will remain pending. If the code is accepted, then REQUESTREVIEW tag associated with the reviewed construct or code will be changed to REVIEWED, in this embodiment by the reviewer.

The previous code snippet illustrating the REQUEST-REVIEW tag called for review of Manager (line 1) and SpecializedDomain (line 4). The following snippet illustrates a reviewer leaving a REQUESTREVIEW for Manager in place (line 1), so the review on that construct remains pending. SpecializedDomain has had the REQUEST-REVIEW tag replaced with the REVIEWED tag (line 4).

```
1    REQUESTREVIEW(Manager):= Employee
2        Experience:= TimeDelta
3        SpecializedDomain
4        REVIEWED(SpecializedDomain):= Type
5            DomainName:= String
6            Certification:= String
```

The reviewer may also respond to a review request with another tag, such as FIX or OPTIMIZE. It will often be helpful for the reviewer to reply with appropriate tag properties, like reason or suggestion, to help the developer author to identify what to improve in their code. Adding an OPTIMIZE tag (line 2) is illustrated below. The tag properties suggestion (line 3) provides a suggested solution to the author requesting review. In this case, note that the reviewer has accepted the construct Manager (line 1) and placed the OPTIMIZE tag on element Experience (line 2) of Manager. The compiler is able to determine when a construct or a dependency of a construct has been modified or tagged in order to determine whether a review for a construct remains pending. The IDE may also, with its source code management system, employ user data and permissions to prevent or allow the use of various tags, such as REVIEWED. Furthermore, if desired, a tag replacement such as REQUESTREVIEW to REVIEWED may be limited to the specific reviewer, or that reviewer and their superiors, etc.

```
1  Manager:= Employee
2      OPTIMIZE(Experience):= TimeDelta
3          suggestion: "Capture this as an expression based on the date of joining of the
           employee"
4      SpecializedDomain
5  REVIEWED(SpecializedDomain):= Type
6      DomainName:= String
7      Certification:= String
```

Figure 12:
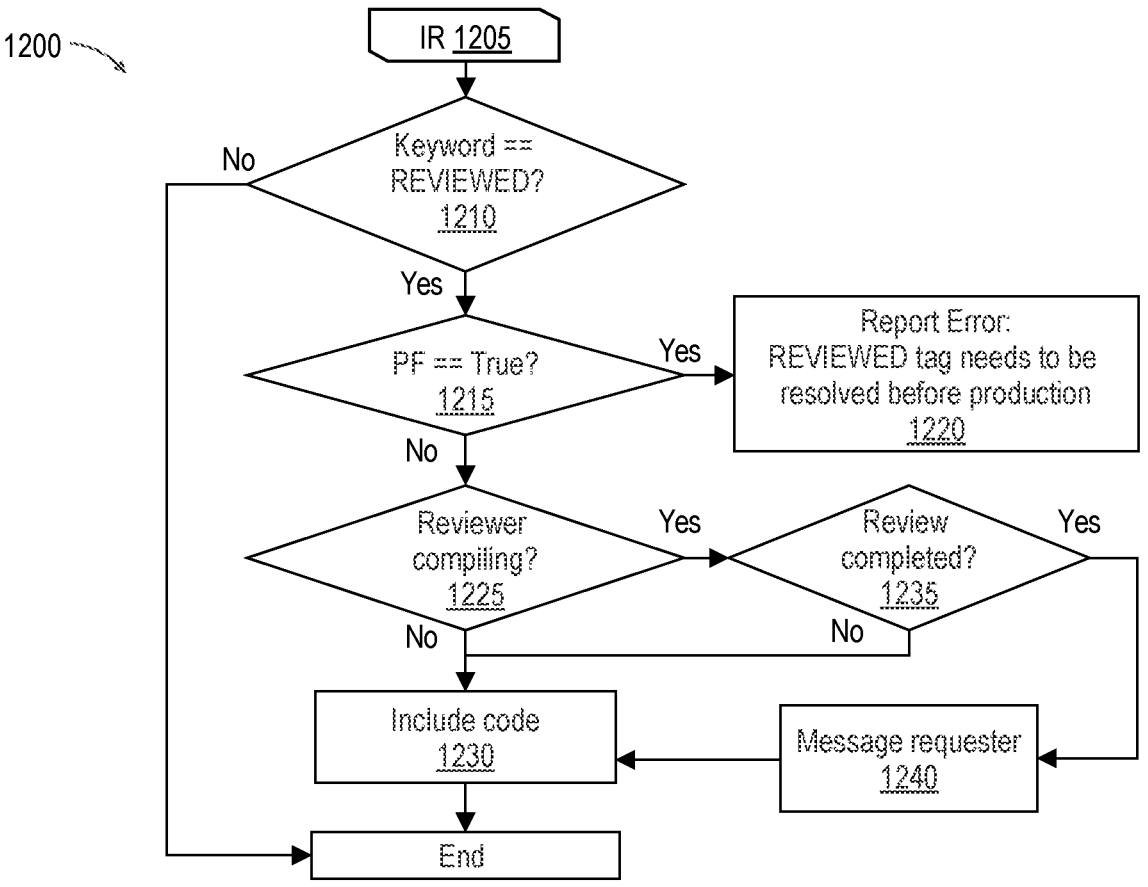
FIG. 12 is a flowchart 1200 illustrating a process for a compiler processing a REVIEWED tag.

FIG. 12 is a flowchart 1200 illustrating a process for a compiler processing a REVIEWED tag. In similar fashion to other tags, the compiler processes a keyword of IR 1205 to determine whether it is a REVIEWED tag (1210). If not, this process completes, and compiler continues to compile remaining next statements. If it is a REVIEWED tag, then the production flag (PF) is checked (1215), and if it is set then the compiler quits. An error is reported (1220) indicating that a REVIEWED tag needs to be resolved before production. If the user compiling is not the reviewer (1225), then the code is included in the compilation (1230), as the REVIEWED tag indicates that a user with proper authority has reviewed it, and the compiler continues to compile remaining statements. If it is the reviewer compiling, then, if the review is complete (1235), a message will be sent to at least the author requesting review (1240). A variety of techniques for determining if a review is complete may be employed. For example, the compiler may save state from previous compilation to recognize that an introduction of the tag (REVIEWED in this case) is new in the source code and sends the message only in that case. If the tag existed in a previous compilation, it is presumed the message was already sent. Alternatively, a messaging engine may keep state regarding completed requests and any responses received. The compiler may use any messaging procedure, such as those detailed with respect to IDE 100 and messaging engine 125 above. If reply to the review request for the construct (or its elements or dependencies) is already pending, there is no need to send a redundant message to the author. In either case, the compiler includes the tagged code (1230) and continues the compilation process with any remaining statements.

Figure 13:
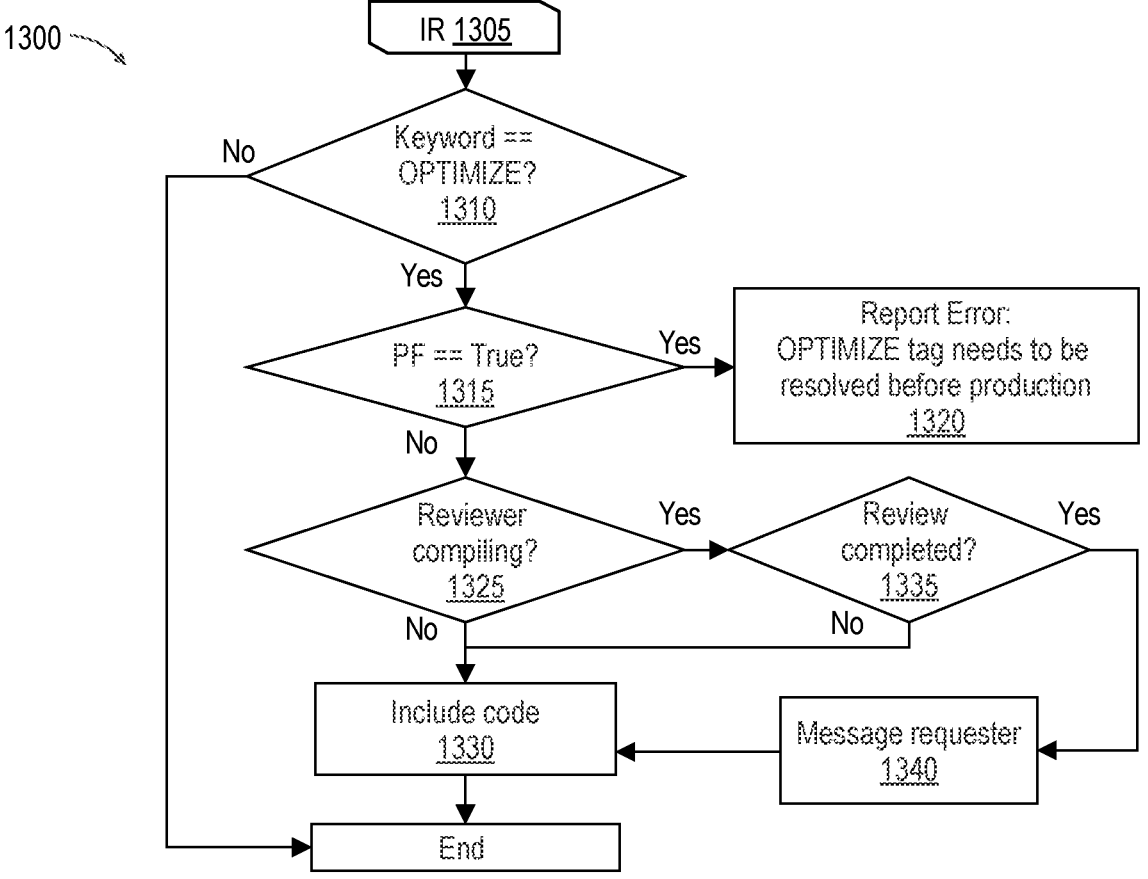
FIGS. 13 and 14 are flowcharts 1300 and 1400 illustrating a process for a compiler processing a FIX tag and OPTIMIZE tag, respectively, in the context of reviewing in response to REQUESTREVIEW.
Figure 14:
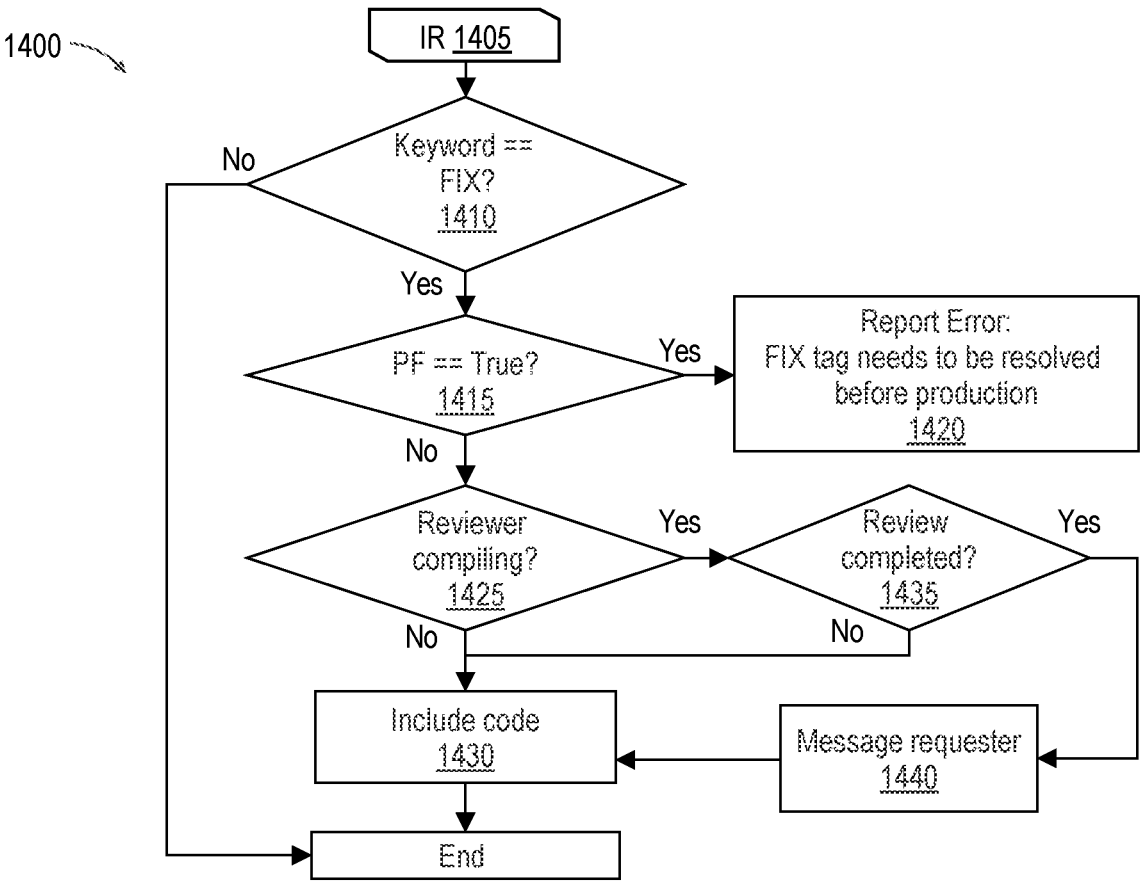

FIGS. 13 and 14 are flowcharts 1300 and 1400 illustrating a process for a compiler processing a FIX tag and OPTIMIZE tag, respectively, in the context of reviewing in response to REQUESTREVIEW. They operate very similarly to flowchart 1200 for the REVIEWED tag just detailed. As with other tags, the compiler processes a keyword of IR 1305 or 1405 to determine whether it is an OPTIMIZE or FIX tag (1310 or 1410). If not, the process completes, and compiler continues to compile remaining next statements. If it is either an OPTIMIZE or FIX tag, then the production flag (PF) is checked (1315 or 1415), and if it is set then the employed. For example, the compiler may save state from previous compilation to recognize that an introduction of the tag (OPTIMIZE or FIX) in this case) is new in the source code and sends the message only in that case. If the tag existed in a previous compilation, it is presumed the message was already sent. Alternatively, a messaging engine may keep state regarding completed requests and any responses received. The compiler may use any messaging procedure, such as those detailed with respect to IDE 100 and messaging engine 125 above. If reply to the review request for the construct (or its elements or dependencies) has already been sent, there is no need to send a redundant message to the author. In either case, the compiler includes the tagged code (1330 or 1430) and continues the compilation process with any remaining statements.

A reviewer has the option to leave the REQUEST-REVIEW tag in place along with a FIX or OPTIMIZE tag added in response. If so, as mentioned above, it will cause the compiler to ignore the code being reviewed when compiling for others than the author (as detailed with respect to FIG. 11). If the code is deemed sufficiently operable by the reviewer, even if requiring something corrected, or improved performance, as indicated by a FIX or OPTIMIZE tag, the reviewer will remove the REQUESTREVIEW and the reviewed code with those tags will compile for all users.

A reviewer also has the option to replace the REQUESTREVIEW tag with a REVIEWED tag, and still include a FIX and/or OPTIMIZE tag applied to constructs within the scope of the reviewed code (identified by the REVIEWED keyword). When using permission control techniques such as those just detailed, after fixing or optimizing in response, the author (when that author does not have write access, such as a junior developer) must attach a new REQUEST-REVIEW to a construct identified by the reviewer needing a fix or optimization. Thus, as before, the junior author is prevented from introducing code into the codebase (that will compile for other users) until it is reviewed and accepted by a reviewing user such as a manager or senior developer.

The following is code from the previous illustration, but in this case the REQUESTREVIEW tag is retained on Manager (line 1) along with the OPTIMIZE tag on Experience:

```
1 REQUESTREVIEW(Manager):= Employee
2    OPTIMIZE(Experience):= TimeDelta
3       suggestion: "Capture this as an expression based on the date of joining of the
      employee"
4    SpecializedDomain
5 REVIEWED(SpecializedDomain):= Type
6    DomainName:= String
7    Certification:= String
``` compiler quits. An error is reported (1320 or 1420) indicating that an OPTIMIZE or FIX tag needs to be resolved respectively before production. If the user compiling is not the reviewer (1325 or 1425), then the code is included in the compilation (1330 or 1430), as the OPTIMIZE or FIX tag indicates that a user with proper authority has reviewed it, and the compiler continues to compile remaining statements. Note that this does not override a REQUESTREVIEW that is still present and associated with the code. In that case, the compiler will have already ignored the code as detailed in 1130 of FIG. 11. If it is the reviewer compiling, if the review is complete (1335 or 1435), a message will be sent to at least the author requesting review (1340 or 1440). A variety of techniques for determining if a review is complete may be The IDE or compiler can use timestamps in tag properties or other system state variables to periodically remind a reviewer if a review is outstanding for more than a prescribed period. Similarly, a developer requesting review can be notified if a FIX or OPTIMIZE received in response is outstanding for longer than a prescribed period.

As introduced earlier, user permissions can be used along with tags REQUESTREVIEW and REVIEWED by the IDE to formalize the example design process methodologies just described. FIG. 15A is a flowchart 1500 illustrating one such process. In this illustration, a request from a user to store source code in the codebase is received (1510). The user level for the requesting user is retrieved from a users/permission database (1515). A permission threshold associated with the source code requested for storage is retrieved from source code management (1520). If the user's level is at or above the threshold (1525), then the source code is stored (1530). For example, a senior developer may have unrestricted read and write access to the source code. If the user is not senior enough (1525), then source code write access is subject to certain restrictions. In this example, the junior developer is not allowed to save code to the code base unless it has been reviewed by a senior developer, and that review is initiated and facilitated by the REQUEST-REVIEW tag. If the code to be stored is tagged with REQUESTREVIEW (1535) then the source code will be stored (1530). However, if the junior developer is attempting to write without that tag, an error (1540) is reported that the user does not have permission to store without the REQUESTREVIEW tag.

FIG. 15B shows an alternate embodiment of flowchart 1500. In this example, if the junior developer is attempting to write source code without REQUESTREVIEW (1535) then the IDE automatically adds the REQUESTREVIEW tag to the new code (1545) and then the code is stored (1530). The error 1540 is not reported, although a notice or other message may be generated to indicate the tag was automatically added, if desired.

In one embodiment, it may be desirable to restrict junior developers to read only access to parts of the code base that have already been reviewed. This alternative flowchart 1500 is depicted in FIG. 15C. In between tests 1525 and 1535, a test 1555 checks if the attempt to store source code includes any code within the scope of previously reviewed code areas. If not, then proceed to 1535 as before. If so, then an error is reported (1560) that the user only has read access to reviewed code.

Figure 16:
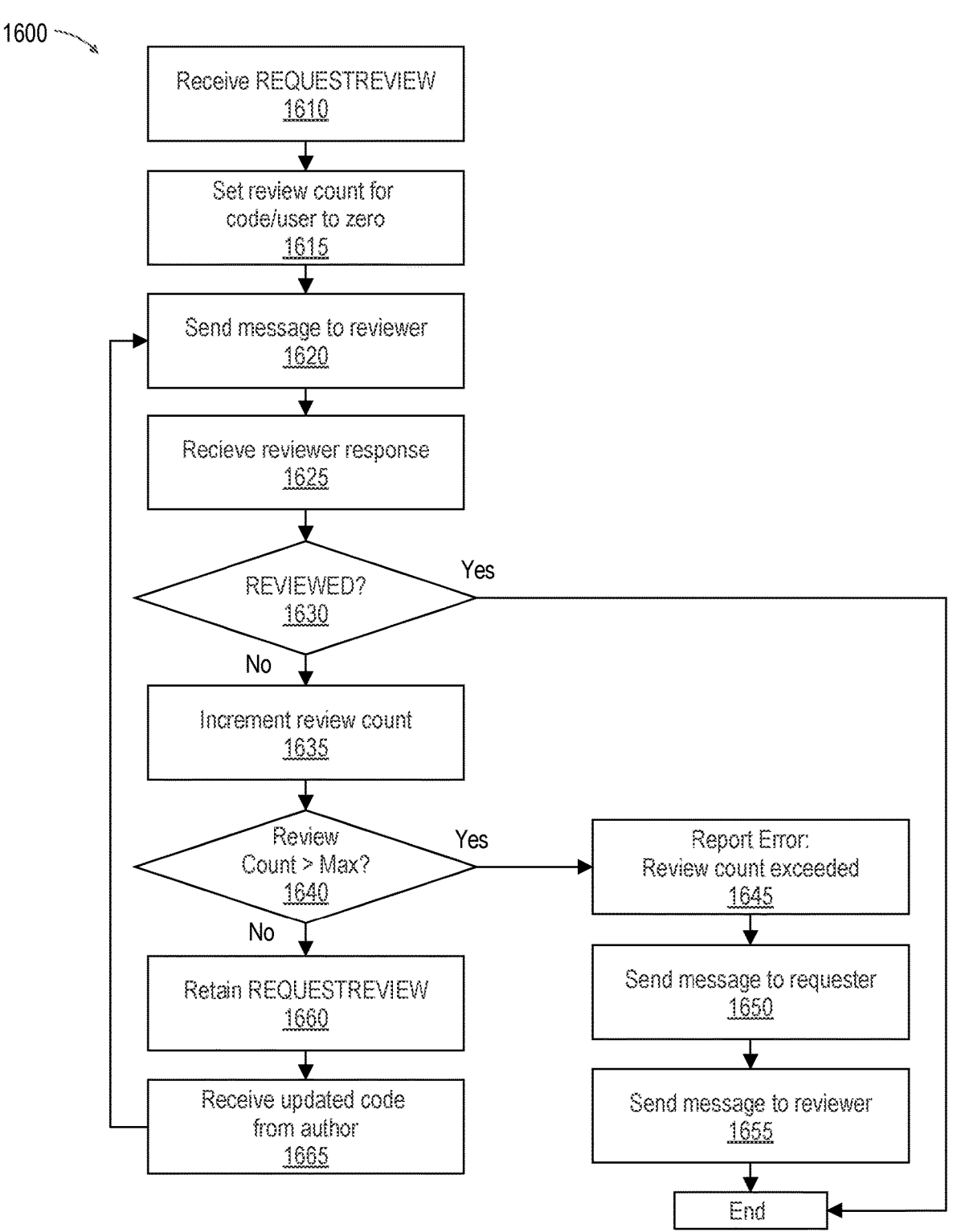
FIG. 16 is a flowchart 1600 illustrating a process of requesting review of, reviewing, and modifying source code while maintaining a count of and limiting the number of review iterations.

FIG. 16 is a flowchart 1600 illustrating a process of requesting review of, reviewing, and modifying source code while maintaining a count of and limiting the number of review iterations. The compiler receives code with an initial REQUESTREVIEW (1610) from an author. A Review Count variable is initialized to zero (1615) and is associated with the particular code or construct and the requesting user, as the compiler may have any number of these processes operating simultaneously with various authors, reviewers, and different parts of the source code. A message is sent to alert a reviewer that code is ready to review (1620). When the compiler receives a response from the reviewer (1625) it checks whether that response is a REVIEWED tag (1630) which indicates the code associated with the review request is now accepted, and the process ends.

If the response from the reviewer is not REVIEWED (1630) then the code is not accepted. The reviewer may include suggestions to correct or optimize the code with a FIX or OPTIMIZE tag to guide the author in the response. In some embodiments, as detailed above, the use of FIX or OPTIMIZE by the reviewer triggers a message to the author that a response is available. In whichever way the reviewer responds (other than REVIEWED), the Review Count variable is incremented (1635) and if it exceeds a predetermined maximum (1640) then an error is reported that the review count has been exceeded (1645). A message (1650) may be sent to the requesting author, as well as to the reviewer (1655). A message to an author may be include text like "The review count has been exceeded for [code identifier]. Please contact the reviewer for further changes." To the reviewer, a notification message may include "The review count is exceeded for the [code identifier] by Author 'A'. Author 'A' will contact you for further guidance." In this case, the process has ended without code being accepted. This iteration count and error/messaging can be used to avoid a struggling developer from spending too long without receiving additional resources or support. The process can be renewed when the author developer is ready.

If the Review Count is less than the maximum (1640) then the REQUESTREVIEW tag is retained (1660). When the compiler receives updated code from the author (1665) the next review iteration commences with a new message to the reviewer (1620). The IDE system may optionally send messages to reviewer and/or author with updates on the review count (not shown).

Figure 17:
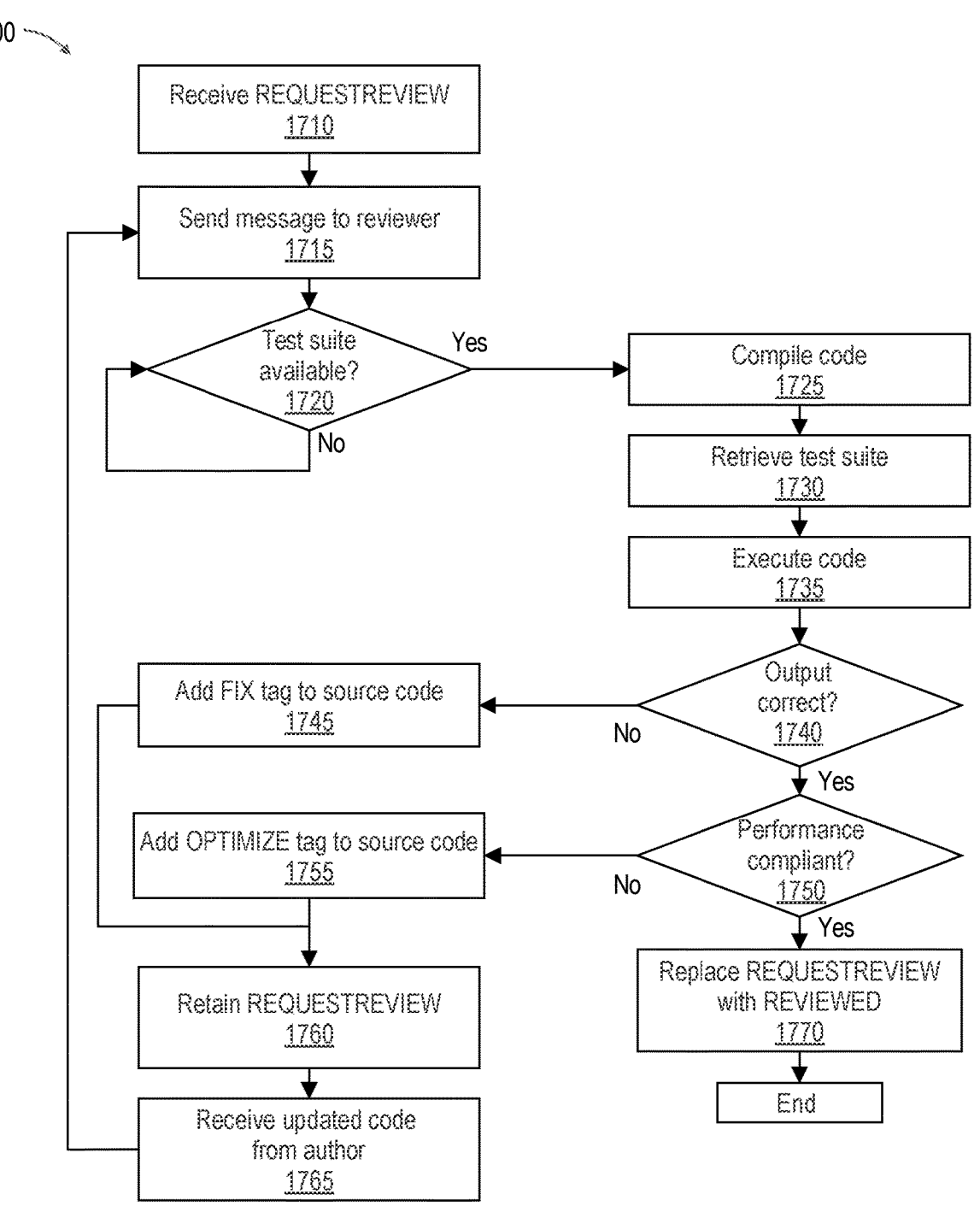
FIG. 17 is a flowchart 1700 illustrating a process for automatic code review in response to a review request.

FIG. 17 is a flowchart 1700 illustrating a process for automatic code review in response to a review request. The compiler receives a REQUESTREVIEW (1710) and sends a message to the reviewer (1715) that source code is awaiting review. The message may prompt the reviewer to provide a test suite, or one could have been already supplied. The compiler determines if the test suite is available (1720) and waits until it is. Not shown are other optional steps such as limiting the wait time and reporting an error if exceeded, or sending reminder messages to the reviewer or author, etc.

The compiler compiles an executable (1725), retrieves the test suite (1730), and executes the code (1735) using the test suite. If the output is not correct (1740), then the compiler adds a FIX tag (1745) to the source code (along with any appropriate properties). If the output is correct, then the compiler determines if the code is compliant with the performance metrics specified with the test suite (1750). If it is not compliant, then the compiler adds an OPTIMIZE tag (1755) to the source code (along with any appropriate properties). As detailed above, the use of FIX or OPTIMIZE may trigger a message to the author that a response is available. If either test fails, the REQUESTREVIEW tag is retained (1760).

When the compiler receives updated code from the author (1765) the next review iteration commences with a new message to the reviewer (1715). Or, in an alternate embodiment (not shown), as the compiler already has the test suite, if it is not desirable to send additional messages to the reviewer during the automated review process, the new message step 1715 can be omitted, with flow directly proceeding to code compilation (1725) and subsequent testing. The test suite is passed when the output is correct (1740) and performance metrics are compliant (1750). In this case the compiler replaces REQUESTREVIEWED with REVIEWED (1770), and the process is complete. While flowchart 1700 illustrates a single author and reviewer for one review request, it will be apparent that any number of review requests from one or more authors to one or more reviewers for various parts of the code may be pending simultaneously, with multiple test suites, and the compiler will manage the steps for each accordingly.

Figure 18:
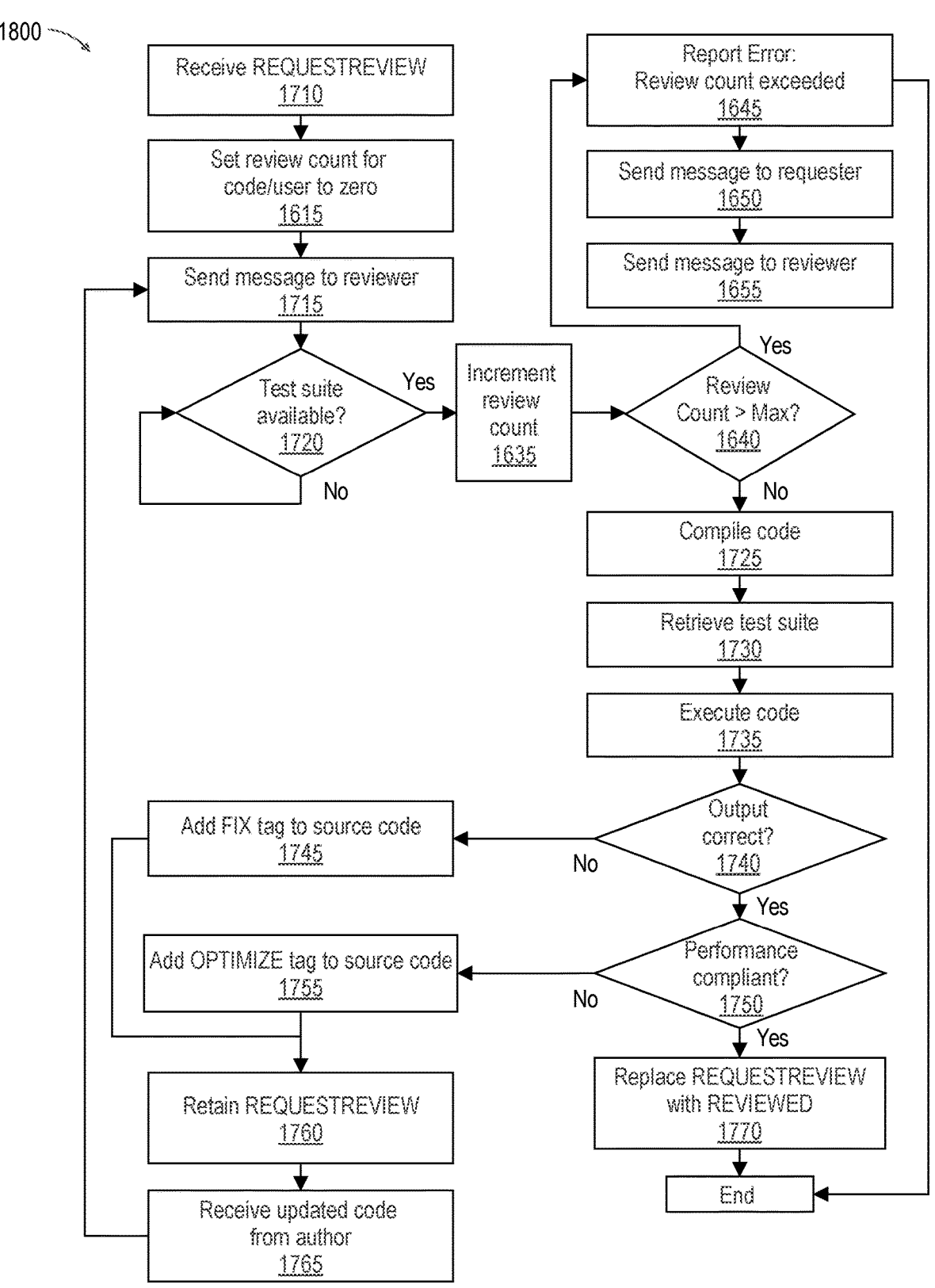
FIG. 18 is a flowchart 1800 combining the review iteration limits of flowchart 1600 with the automatic review of flowchart 1700.

FIG. 18 is a flowchart 1800 combining the review iteration limits of flowchart 1600 with the automatic review of flowchart 1700, and like numbers from those flowcharts are used. This process is useful to combine automatic review while avoiding a struggling developer spending too long without receiving additional resources or support.

The compiler receives code with an initial REQUEST-REVIEW (1710) from an author. A Review Count variable is initialized to zero (1615), associated with the particular code or construct and the requesting user, as detailed above, and a message is sent to alert a reviewer that code is ready to review (1715). Once the test suite is available (1720), the Review Count variable is incremented (1635) and if it exceeds a predetermined maximum (1640) then error generation (1645) and messaging (1650 and 1655) are performed as described in FIG. 16. The process ends without code being accepted. As above, the process can be renewed when the author developer is ready.

If the Review Count is not greater than the maximum number of iterations, then the process continues with compiling, testing, and source code tag additions as detailed with respect to FIGS. 17 (1725-1755). When the compiler receives updated code from the author (1765) the next review iteration commences with a new message to the reviewer (1715). As in FIG. 17, in an alternate embodiment the reviewer messaging can be omitted and the flow proceeds from 1765 to 1635 to increment Review Count, test for a maximum (1640) and either produce an error or perform the next compilation. The REQUESTREVIEW tag is retained (1760) until the code passes the test suite and is replaced by REVIEWED (1770) (or produces an error 1645).

CANDIDATE

The CANDIDATE tag is useful to engage the compiler to assist when there are multiple approaches to a software development problem. Each possible solution is identified with a CANDIDATE tag. The compiler compiles an executable code for each possibility. Profiling tests measure computation time and resource usage for each candidate. In one embodiment, the profiling test results for all candidates are delivered to a developer to choose the best candidate. In an alternate embodiment, the best candidate is chosen automatically by the compiler based on profiling results using appropriate configuration details, such as memory usage, clock speed, CPU utilization, power usage, and others. Profiling tests of candidates for various target hardware architectures may also be run.

There will be at least two candidates for a particular construct to invite comparison. There may be multiple constructs for which candidate profiling is desired. For example, in source code with M candidates for a first construct and N candidates for a second construct, there will be M+N CANDIDATE tags for the compiler to process, but M*N combinations the compiler must compile and profile.

The following code with the previous example IsEven? construct is useful to illustrate the following code with CANDIDATE tags:

```
1    CANDIDATE(IsEven?, author: "A"):= Expression
2    parameter
3        number
4    return
5        number % 2 == 0
6    CANDIDATE(IsEven?, author: "A"):= Function
7    parameter
8        number
9    state
10       FlipFlop?:= Boolean(init: 'TRUE')
11   for_each(Step, in: [1..number])
12       update(flip_flop?: not?(flip_flop?))
13   return
14       flip_flop?
```

In this example the construct IsEven? has two candidates identified by the CANDIDATE tag. Note that the compiler can compare code with different code constructs, an expression and a function in this example, simply by associating each candidate with the keyword (construct name) IsEven? For this simple illustrative example, the compiler would compile two versions for runtime profiling: a first utilizing the modulo operator and the second with the flip flop implementation. In one embodiment the compiler may deliver both results to the developer to select the best. In another embodiment the compiler identifies the best candidate. In this case, based on execution time as the selection criteria profiled, the expression utilizing the modulo operator will run faster than the flip flop version, so that will be the best candidate selected by the compiler.

The following code example illustrates broad applicability to various syntaxes in any programming language with candidate tags being used for two different cases or problems. The first problem is to search for a number from an array of elements. The second is to check whether the searched number is even or odd.

```
1    int CANDIDATE(search)(int arr[ ], int N, int x) //Example 1
2    {
3        for(int i = 0; i < N; i++)
4            if(arr[i] == x)
5                return i;
6        return −1;
7    }
8    void CANDIDATE(search)(int arr[ ], int n) //Example 2
9    {
10       int i, key, j;
11       for(i = 1; i < n; i++)
12       {
13           key = arr[i];
14           j = i − 1;
15           while(j >= 0 && arr[j] > key)
16           {
17               arr[j + 1] = arr[j];
18               j = j − 1;
19           }
20           arr[j + 1] = key;
21       }
22   }
23   void CANDIDATE(CheckEvenOdd)(int n) //Example 3
24   {
25       int r = n % 2; // Find remainder (r), if r = 0, n is even
             else its odd.
26       if(r == 0)
27           printf("Even");
28       else
29           printf("Odd");
30   }
31   int CANDIDATE(checkEvenOdd)(int n) //Example 4
32   {
33       if (n & 1) //where & is the bit-wise AND operator.
34           return 1;
35       else
36           return 0;
37   }
```

Case 1 has two implementations for searching: example 1 (lines 1-7) using linear search and example 2 (lines 8-22) using binary search. Case 2 has two implementations for determining parity of a number: example 3 (lines 23-30) using the modulus operator and example 4 (lines 31-37) using the bitwise AND operator. All the implementations for consideration are wrapped using the CANDIDATE tag, and multiple instances of a case implementation can be included in the same source code, as illustrated. The cases are identified by the construct name, "search" for case 1, and "checkEvenOdd" for case 2. The compiler determines the number of combinations and selects the best combination from them.

Figures 19A, 19B, 19C:
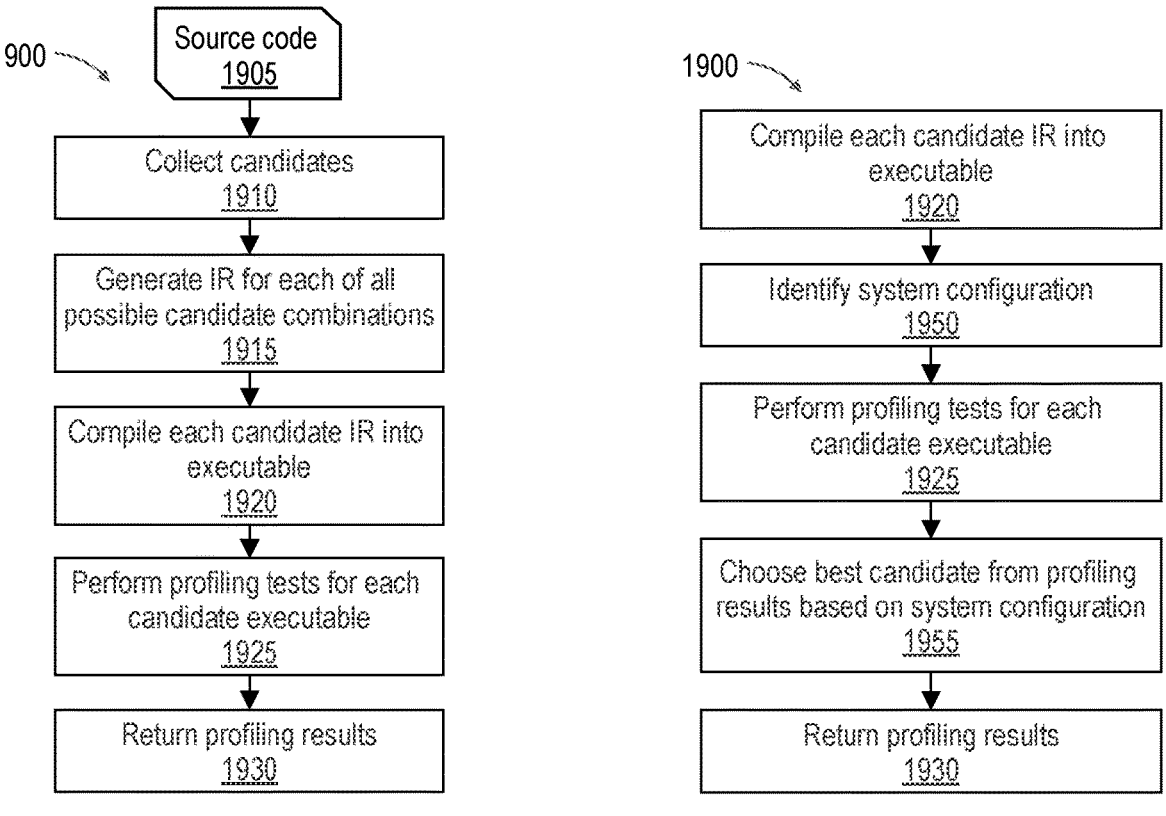
FIGS. 19A-C depict flowchart 1900 illustrating a compiler processing a CANDIDATE tag.

FIG. 19A is a flowchart illustrating processing of CANDIDATE tags in source code. The compiler collects all candidates (1910) from source code 1905. An IR is generated for each of all the possible candidate combinations (1915). Each candidate IR is compiled into an executable (1920) and profiling tests for each candidate are performed (1925). The profiling results are then returned (1930). In general, all the profiling results may be returned for inspection by a developer, or a subset of results, including a selected best result.

FIG. 19B is an alternate embodiment of flowchart 1900 showing a compiler selecting the best candidate result. Here the additional step of identifying a system configuration (1950) is performed prior to profiling (1925), and the compiler chooses the best candidate from the profiling results based on that system configuration (1955) and returns that best candidate as the profiling result (1930)

Those of skill in the art will recognize that any of a variety of code levels may be used to form the combinations. Using the earlier example, in source code with M candidates for a first construct and N candidates for a second construct, there will be M+N CANDIDATE tags located in the source code. There will be M*N combinations the compiler must compile and profile. So, the compiler could simply generate M*N versions of the source code, where only one candidate of the M candidates and one candidate of the N candidates is included in each. In the example embodiment the compiler will operate on IR code to generate the M*N combinations, and binaries for each. The M*N candidate binaries are profiled to provide detailed results about which is the best combination. Note that the steps may be carried out sequentially as shown, but that is not required. A compiler may iterate between compiling and profiling a candidate then another, and candidates may be processed in parallel. Furthermore, IR combinations may be generated concurrently while evaluating statements from the parse tree.

FIG. 19C is a flowchart 1910 illustrating an embodiment of step 1910, the collecting of candidates. This is an example process that the compiler can employ as it evaluates statements from a parse tree. All statements will be evaluated to locate all the possible candidates. It may be preferable in some instances that candidates for a particular construct are located near each other in source code and perhaps in order, but that is not a requirement. A list of constructs for which CANDIDATE tags will be generated, as well as an array of the locations of each CANDIDATE code for each respective construct.

As the compiler is processing a keyword, it checks whether it has encountered a CANDIDATE tag (1960). If not, this process completes, and the compiler continues to compile remaining next statements. If it is a CANDIDATE tag, then the production flag (PF) is checked (1965), and if it is set then the compiler quits. An error is reported (1970) indicating that a CANDIDATE tag needs to be resolved before production. Otherwise, the compiler checks if the CANDIDATE construct name is already in the candidate list (1975), which would happen if a previous statement had a CANDIDATE tag for a construct with the same name. If not, the name associated with the CANDIDATE construct is added to the candidate list. Recall that the multiple constructs of varying kind with the same name do not cause a conflict because only one candidate construct for each name will be used in each combination for compiling and profiling. In either case, the location in the IR for the tagged CANDIDATE construct is added to an array of locations associated with the candidate construct name. At the end of the process, the compiler has a list of arrays containing code locations from which combinations of code can be generated.

It collects the multiple candidate solutions associated with a single problem. The multiple candidates undergo profiling tests with a variety of inputs to see which approach is superior. The profiling tests that include determining the computation time and resource usage for each candidate solutions are displayed by the compiler. The developer chooses a candidate as per the desired requirements.

In an embodiment of CANDIDATE tag usage, the best candidate is chosen automatically based on the appropriate system configuration details (memory usage, clock speed, CPU utilization and others). Each of multiple candidates undergo profiling tests with a variety of inputs for each system configuration to see which approach is superior. The profiling tests include determining the computation time and resource usage for each candidate solution, with the candidate that best suits the current configuration is running is chosen. For one example, low computation time and less resource utilization determines the chosen candidate. Or, if the system configuration has high memory usage, then the candidate consuming less memory is chosen.

Figure 20A:
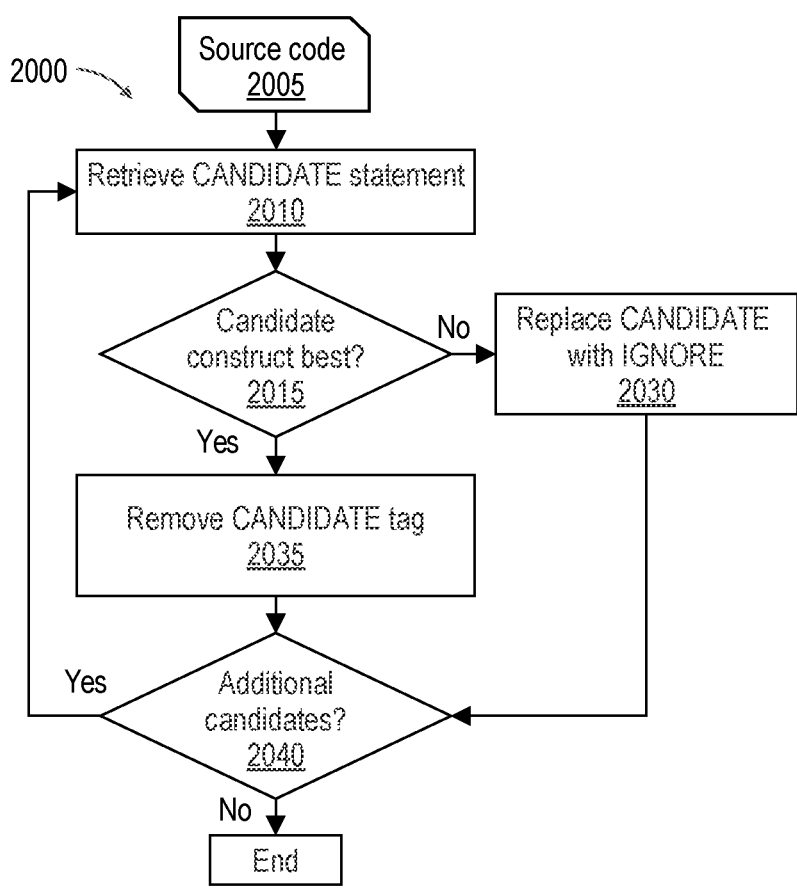
FIGS. 20A and 20B depict flowchart 2000 illustrating a compiler modifying source code in response to CANDIDATE and BESTCANDIDATE tag processing.

FIG. 20A is a flowchart 2000 illustrating a compiler modifying source code in response to CANDIDATE processing. In this embodiment, the compiler will return the profiling results to the developers by directly modifying the source code (2005). Of course, any type of messaging detailed herein could be deployed to provide profiling results as well. The compiler, now having completed profiling and having identified the best candidate, proceeds to a retrieve a CANDIDATE statement (2010). Note that the compiler can save a location for each CANDIDATE statement in the source code during compilation, to facilitate this post-processing, but other methods would work effectively as well. If the construct in the retrieved statement is the best (2015), then the CANDIDATE tag will be removed (2035). If not, then the CANDIDATE statement will be replaced with IGNORE (2030). Properties with information about the profiling may be included in that IGNORE tag if desired. Note that when multiple candidate sets have been included in the testing (e.g., candidates for more than one named construct), then there will be one best candidate for each construct name. The process continues until all CANDIDATE statements in the source code have been processed (2040). The result is that only one of each candidate set will remain in the source code untagged (e.g., best), and all the others will have been tagged IGNORE.

Figure 20B:
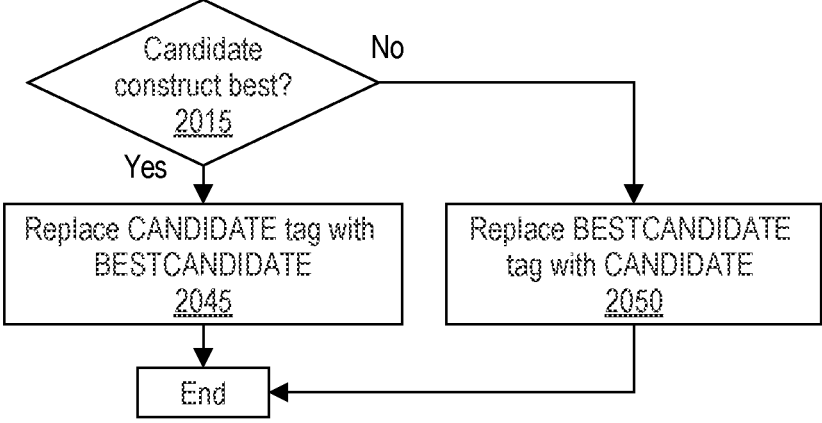

An alternate embodiment of flowchart 2000 introducing the BESTCANDIDATE tag is illustrated in FIG. 20B. In this case, for a selected candidate (which can be labeled with CANDIDATE or BESTCANDIDATE), rather than tagging discarded candidates with IGNORE (2030) and leaving clean the best result or results (2035), the best result or results are identified by replacing the CANDIDATE keyword with BESTCANDIDATE (2045). If the candidate was labeled BESTCANDIDATE from a previous compilation, but is no longer the best, then the BESTCANDIDATE keyword is replaced with CANDIDATE (2050). A benefit of this scheme is that if the developer wishes to run the tests again, perhaps with different system configuration or target hardware environment, there is no need to find and modify the IGNORE tags. The subsequent profiling may yield a different set of best candidates, and the modifications between BESTCANDIDATE and CANDIDATE will be made as just described.

Figure 21:
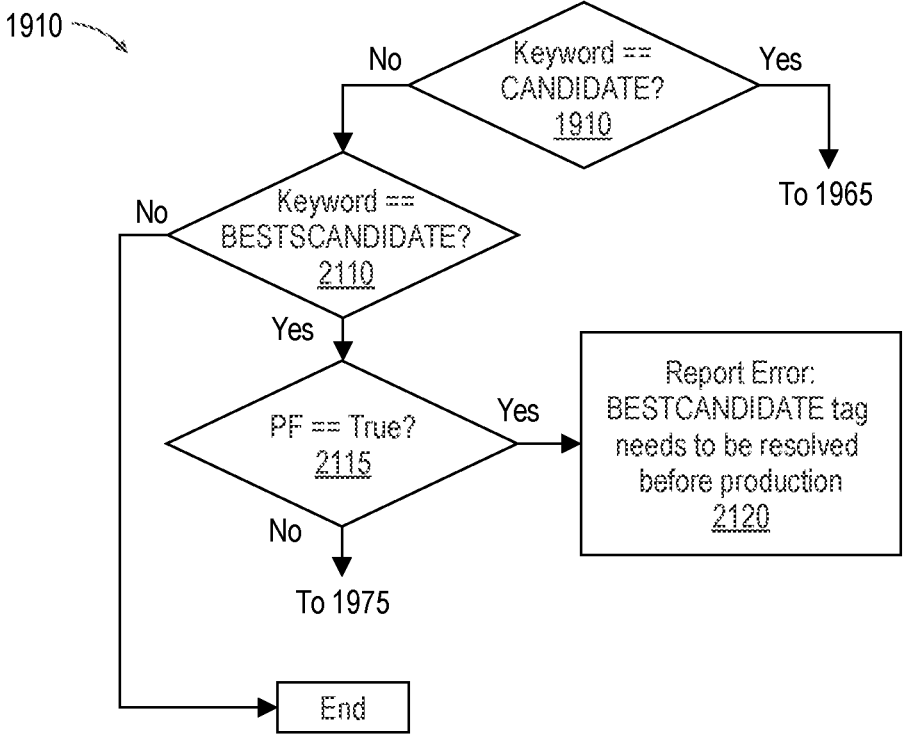
FIG. 21 illustrates an alternate embodiment of BESTCANDIDATE processing.

A modification of flowchart 1910 in FIG. 21 illustrates the compiler processing BESTCANDIDATE. In this embodiment, the processing of BESTCANDIDATE during compile is treated the same as CANDIDATE. Here, if the keyword is not CANDIDATE (1910), an additional test to determine if it is a BESTCANDIDATE tag (2110). If so, then the production flag (PF) is checked (2115), and if it is set then the compiler quits. An error is reported (2120) indicating that a BESTCANDIDATE tag needs to be resolved before production. The process continues to step 1975 to process as a candidate.

In another alternate embodiment, not shown, the compiler simply equates CANDIDATE and BESTCANDIDATE during compilation, and generates any notifications or errors based on either one of them being encountered.

SECURITY ASPECTS

Some examples of tags used in conjunction with user permissions and access have been detailed above. As a general principle, a development environment may have a user/permission hierarchy, including any number of users, any number of levels, and any set of rules for allowing read, write, edit, delete, execute, or other permissions to all or parts of source code, and any resultant binaries. The hierarchy can be deployed using any technique, such as a user/permissions database in conjunction with a SCM system. Alternatively, hierarchy could be saved in the source code, using tag properties, or extending the tags detailed herein with additional tags. Some levels of user may be given unlimited access. In other cases, the access protocols may differ between one or more tags.

Any tag can be defined to allow permission-based access to the portion of source code enclosed with tags (as well as the associated scope). For example, in one embodiment detailed above, for junior developers below a certain level, the REVIEWED tag allowed read only access and disallowed write access to the source code within the scope of the tagged construct. Permission-based access may also be regulated by requiring a developer use one or more specific tags when that developer does not have a sufficient permission level. The example provided above illustrates this principle, as junior developers were required to use REQUESTREVIEW when introducing new source code. As detailed, a further security aspect is that the treatment of tagged constructs by the compiler can be different based on the identity of the user making a compile request, and in accordance with permission levels. As another example, perhaps for IGNORE and DEACTIVATE tags, the author and superiors in the hierarchy are allowed access to the tagged code, whereas other developers are not.

Alert Messages

As described earlier, with respect to FIG. 3, an alert message is a variant of compiler message. The compiler continues the compilation process after generating an appropriate 'alert message'. Messages can be generated for any and all tags. They may include information about the presence of tags, notify developers to resolve issues before production, and the like. General alert message (displayed to all the developers) as well as personalized alert message may be deployed.

A variety of example general and personalized alert messages for the tags are shown below. Let 'A' be an author, 'R' is a reason, 'S' is a suggestion, 'T' is a timestamp, 'D' is a deadline date, and 'P' is a priority. As described above, the build system may provide defaults for some properties, the compiler may introduce information as a result of a compiler directive, or the author of a tag may populate them. A priority may be high, medium, or low, in this example, although any priority scheme can be used.

For the IGNORE tag, the alert message includes the reason 'R', if it is provided as a tag property by 'A':

"The construct is ignored by author 'A' for reason 'R'. Please resolve the IGNORE tag before production stage."

For the DEACTIVATE tag without condition, the alert message includes the reason 'R', if it is provided as a tag property by 'A':

"The construct and all its associated dependencies are deactivated by author 'A' for reason 'R'. Please resolve the DEACTIVATE tag before production stage."

For DEACTIVATE with condition, two examples for the condition satisfied, or not:

"The construct and all its associated dependencies are deactivated by author 'A' for reason 'R' since the condition (until tag property) is satisfied. Please resolve the DEACTIVATE tag before production stage." (Condition Met).

"The construct is not deactivated by author 'A' since the condition is not satisfied. Please resolve the DEACTIVATE tag before production stage." (Condition Not Met).

For the OPTIMIZE TAG, an alert message is as follows:

"The construct needs to be optimized by author 'A' at 'T' timestamp for a reason 'R' within a deadline date 'D' with priority 'P'. Suggested: 'S'. Please resolve the OPTIMIZE tag before production stage."

For the FIX TAG, an alert message is as follows:

"The construct needs to be fixed by author 'A' at 'T' timestamp for a reason 'R' within a deadline date 'D' with priority 'P'. Suggested: 'S'. Please resolve the FIX tag before production stage."

For the ALTERNATE tag:

"The construct needs to be fixed by author 'A' for a reason 'R' within a deadline date 'D'. Please resolve the ALTERNATE tag before production stage."

For the PROTOTYPE tag, the alert message may be displayed as follows:

"The construct is a prototype and needs to be implemented fully by author 'A' at "T" timestamp for a reason 'R' within a deadline date 'D'. Suggestion: 'S'."

Example messages for REQUESTREVIEW, REVIEWED, and others are included in the detailed description above. Those of skill will recognize these messages are illustrative only, and any number of alert messages may be deployed, with increased or decreased information and/or frequency.

Figure 22:
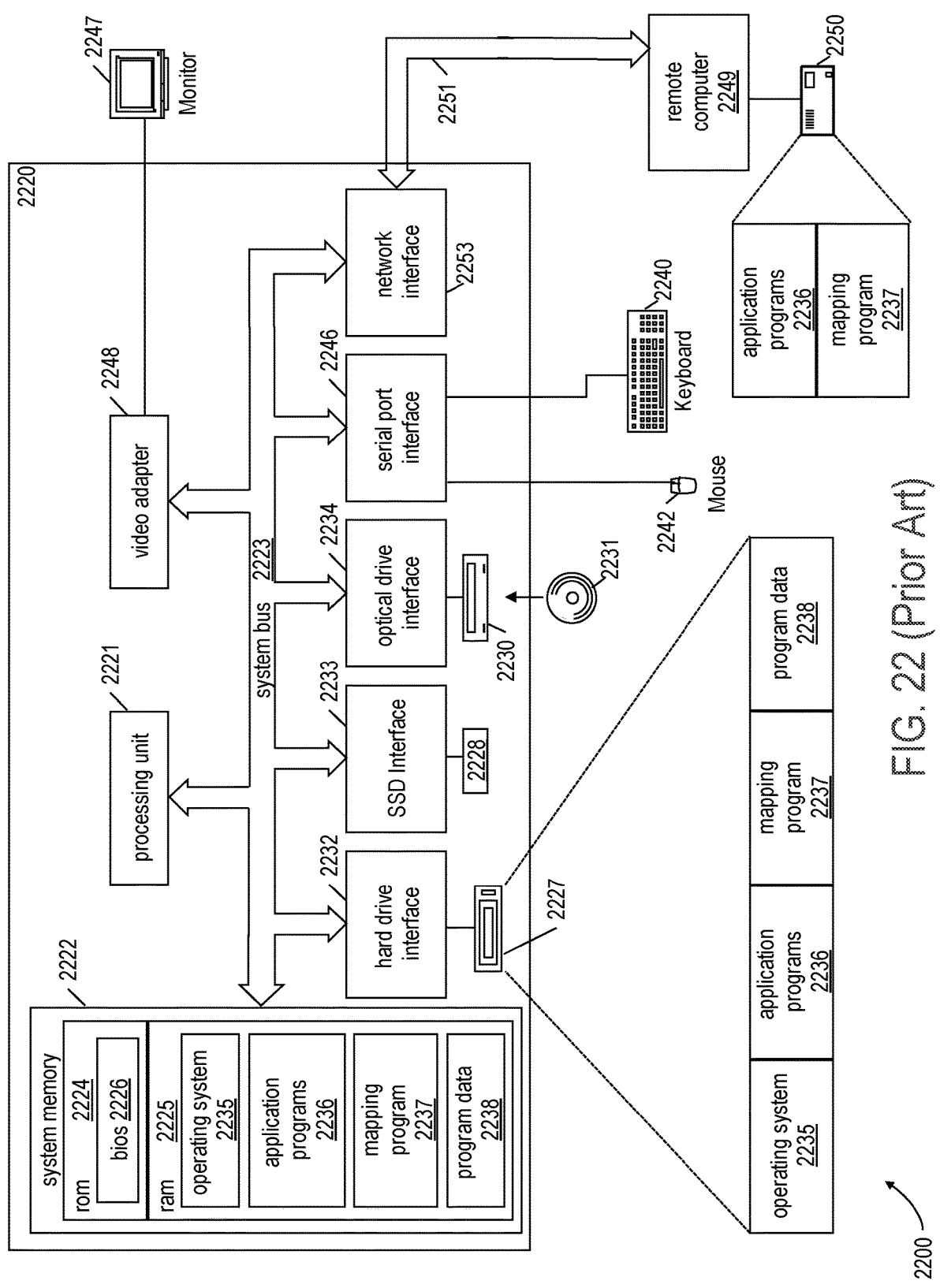
FIG. 22 (prior art) depicts a general-purpose computing system 2200, one or more of which can be configured to perform operations described with respect to FIG. 1.

FIG. 22 (prior art) depicts a general-purpose computing system 2200 that can serve as a client or a server depending on the program modules and components included. One or more computers of the type depicted in computing system 2200 can be configured to perform operations described with respect to FIG. 1. Those of skill in the art will appreciate that the invention may be practiced using other system configurations, including hand-held devices, multiprocessor systems, microprocessor-based or programmable consumer electronics, network PCs, minicomputers, mainframe computers, and the like. User terminals 115 can embody any of these, for example.

Computing system 2200 includes a conventional computer 2220, including a processing unit 2221, a system memory 2222, and a system bus 2223 that couples various system components including the system memory to the processing unit 2221. The system bus 2223 may be any of several types of bus structures, including a memory bus or memory controller, a peripheral bus, and a local bus using any of a variety of bus architectures. The system memory includes read only memory (ROM) 2224 and random-access memory (RAM) 2225. A basic input/output system 2226 (BIOS), containing the basic routines that help to transfer information between elements within the computer 2220, such as during start-up, is stored in ROM 2224. The computer 2220 further includes a hard disk drive 2227 for reading from and writing to a hard disk, not shown, a solid-state drive 2228 (e.g., NAND flash memory), and an optical disk drive 2230 for reading from or writing to an optical disk 2231 (e.g., a CD or DVD). The hard disk drive 2227 and optical disk drive 2230 are connected to the system bus 2223 by a hard disk drive interface 2232 and an optical drive interface 2234, respectively. The drives and their associated computer-readable media provide nonvolatile storage of computer readable instructions, data structures, program modules and other data for computer 2220. Other types of computer-readable media can be used.

Program modules are stored on non-transitory, computer-readable media such as disk drive 2227, solid state disk 2228, optical disk 2231, ROM 2224, and RAM 2225. The program modules include an operating system 2235, one or more application programs 2236, other program modules 2237, and program data 2238. An application program 2236 can used other elements that reside in system memory 2222 to perform the processes detailed above.

A user may enter commands and information into the computer 2220 through input devices such as a keyboard 2240 and pointing device 2242. Other input devices (not shown) may include a microphone, joystick, game pad, satellite dish, scanner, or the like. These and other input devices are often connected to the processing unit 2221 through a serial port interface 2246 that is coupled to the system bus, but may be connected by other interfaces, such as a parallel port, game port, universal serial bus (USB), or various wireless options. A monitor 2247 or other type of display device is also connected to the system bus 2223 via an interface, such as a video adapter 2248. In addition to the monitor, computers can include or be connected to other peripheral devices (not shown), such as speakers and printers.

The computer 2220 may operate in a networked environment using logical connections to one or more remote computers, such as a remote computer 2249. The remote computer 2249 may be another computer, a server, a router, a network PC, a peer device, or other common network node, and typically includes many or all the elements described above relative to the computer 2220 (although only a memory storage device 2250 has been illustrated in FIG. 22 to show support for various components of IDE 100 noted above in connection with FIG. 1). The logical connections depicted in FIG. 22 include a network connection 2251, which can support a local area network (LAN) and/or a wide area network (WAN). Such networking environments are commonplace in offices, enterprise-wide computer networks, intranets, cellular data systems, and the Internet in general. Network connection 2251 may be used to connect to one or more user terminals 115 (not shown). Furthermore, network 2251 may connect to any number of distributed systems such as cloud-based storage or other web-based applications.

Computer 2220 includes a network interface 2253 to communicate with remote computer 2249 via network connection 2251. In a networked environment, program modules depicted relative to the computer 2220, or portions thereof, may be stored in the remote memory storage device. It will be appreciated that the network connections shown are exemplary and other means of establishing a communication link between the computers may be used.

The foregoing description of the implementations of the present techniques and technologies has been presented for the purposes of illustration and description. This description is not intended to be exhaustive or to limit the present techniques and technologies to the precise form disclosed. Many modifications and variations are possible in light of the above teaching. It is intended that the scope of the present techniques and technologies are not limited by this detailed description. The present techniques and technologies may be embodied in other specific forms without departing from the spirit or essential characteristics thereof. The modules, routines, features, attributes, methodologies, and other aspects of the present disclosure can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, and not limiting. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A method of compiling source code, the method comprising:
    parsing a first source code statement, the first source code statement having:
        a keyword; and
        a first programming language construct having a first name and defined using first instructions;
    wherein the keyword identifies the first programming language construct as a first candidate construct associated with the first name;
    parsing a second source code statement, the second source code statement having:
        the keyword; and
        a second programming language construct having the first name;
    wherein the keyword identifies the second programming language construct as a second candidate construct associated with the first name;
    responsive to the keyword in the first source code statement, compiling the first candidate construct into a first executable code;
    responsive to the keyword in the second source code statement, compiling the second candidate construct into a second executable code, wherein the first and second executable codes provide alternative implementations of the programming language construct having the first name;
    profiling the first executable code to produce a first profiled result;
    profiling the second executable code to produce a second profiled result;
    comparing the first and second profiled results; and
    selecting one of the first and second candidate constructs based on at least one criteria.

2. The method of claim 1, wherein the criteria includes at least one of memory usage, processor utilization, clock speed, power consumption, and network usage.

3. The method of claim 1, wherein the keyword is a candidate keyword, further comprising:

responsive to selecting the first candidate construct:

removing the candidate keyword in the first source code statement; and replacing the candidate keyword in the second source code statement with an ignore keyword; and responsive to selecting the second candidate construct:

removing the candidate keyword in the second source code statement; and replacing the candidate keyword in the first source code statement with the ignore keyword.

4. The method of claim 1, wherein the keyword is either a candidate keyword or a best candidate keyword, further comprising:

responsive to selecting the first candidate construct:

replacing the keyword in the first source code statement with the best candidate keyword; and replacing the keyword in the second source code statement with the candidate keyword; and responsive to selecting the second candidate construct:

replacing the keyword in the second source code statement with the best candidate keyword; and replacing the keyword in the first source code statement with the candidate keyword.

5. The method of claim 1, further comprising sending a message with the first and second profiled results.

6. The method of claim 1, further comprising sending a message with the selected candidate construct.

7. The method of claim 1, further comprising:

parsing a third source code statement, the third source code statement having:

the keyword; and a third programming language construct having a second name;

wherein the keyword identifies the third programming language construct as a first candidate construct associated with the second name;

parsing a fourth source code statement, the fourth source code statement having:

the keyword; and a fourth programming language construct having the second name;

wherein the keyword identifies the fourth programming language construct as a second candidate construct associated with the second name;

compiling the third programming language construct into a third executable code; and compiling the fourth programming language construct into a fourth executable code.

8. The method of claim 7, wherein:

the first executable code is compiled with the first and third programming language constructs;

the second executable code is compiled with the second and fourth programming language constructs;

the third executable code is compiled with the third and second programming language constructs;

the fourth executable code is compiled with the fourth and first programming language constructs.

9. A method of compiling source code for a computer program, wherein the source code provides instructions for performing computational functions, the method comprising:

encountering a first statement naming a first candidate construct of the source code, the first candidate construct configured to produce a computational output;

encountering a second statement naming a second candidate construct of the source code, the second candidate construct configured to produce the computational output;

evaluating the first candidate construct, the first candidate construct being compiled, to produce a first measure of performance;

evaluating the second candidate construct, the second candidate construct being compiled, to produce a second measure of performance; and comparing the first measure of performance with the second measure of performance.

10. The method of claim 9, wherein each of the first measure of performance and the second measure of performance includes at least one of computation time and resource usage.

11. The method of claim 9, further comprising reporting at least one of the first measure of performance and the second measure of performance.

12. A system for compiling source code, comprising:

a processor;

a memory communicatively coupled to the processor, the memory storing instructions executable by the processor;

the processor configured to:

parse a first source code statement, the first source code statement having:

a keyword; and a first programming language construct having a first name and defined using first instructions;

wherein the keyword identifies the first programming language construct as a first candidate construct associated with the first name;

parse a second source code statement, the second source code statement having:

the keyword; and a second programming language construct having the first name and defined using second instructions;

wherein the keyword identifies the second programming language construct as a second candidate construct associated with the first name;

compile, responsive to the keyword in the first source code statement, the first programming language construct into a first executable code;

compile, responsive to the keyword in the second source code statement, the second programming language construct into a second executable code;

profile the first executable code to produce a first profiled result;

profile the second executable code to produce a second profiled result;

compare the first and second profiled results; and select one of the first and second candidate constructs based on at least one criteria.

13. The system of claim 12, wherein the criteria includes at least one of memory usage, processor utilization, clock speed, power consumption, and network usage.

14. The system of claim 12, wherein the keyword is a candidate keyword, the processor further configured to:

remove the candidate keyword in the first source code statement responsive to selecting the first candidate construct;

replace the candidate keyword in the second source code statement with an ignore keyword responsive to selecting the first candidate construct;

remove the candidate keyword in the second source code statement responsive to selecting the second candidate construct; and replace the candidate keyword in the first source code statement with the ignore keyword responsive to selecting the second candidate construct.

15. The system of claim 12, the processor further configured to send a message with the first and second profiled results.

16. The system of claim 12, the processor further configured to send a message with the selected candidate construct.

\* \* \* \* \*